Figure 1:
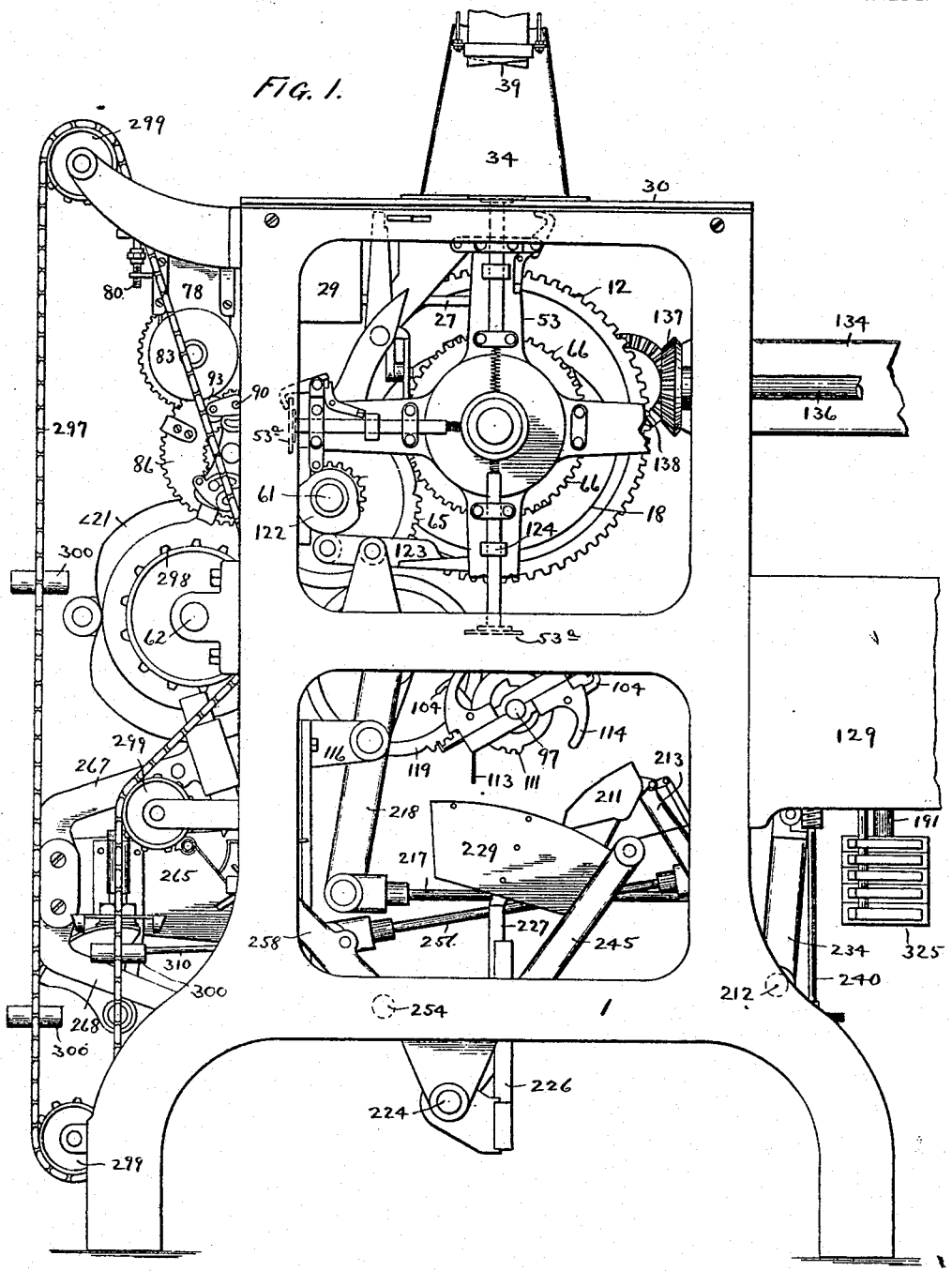

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 1.

WITNESSES. INVENTOR
H. B. Hallock. Alfred H. Randall Jr.
L. A. Morrison BEST AVAILABLE COPY No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 2

WITNESSES.
H. B. Hallock
L. H. Morrison

INVENTOR.
Alfred H. Randall Jr.
By W. Preston Williamson
Atty

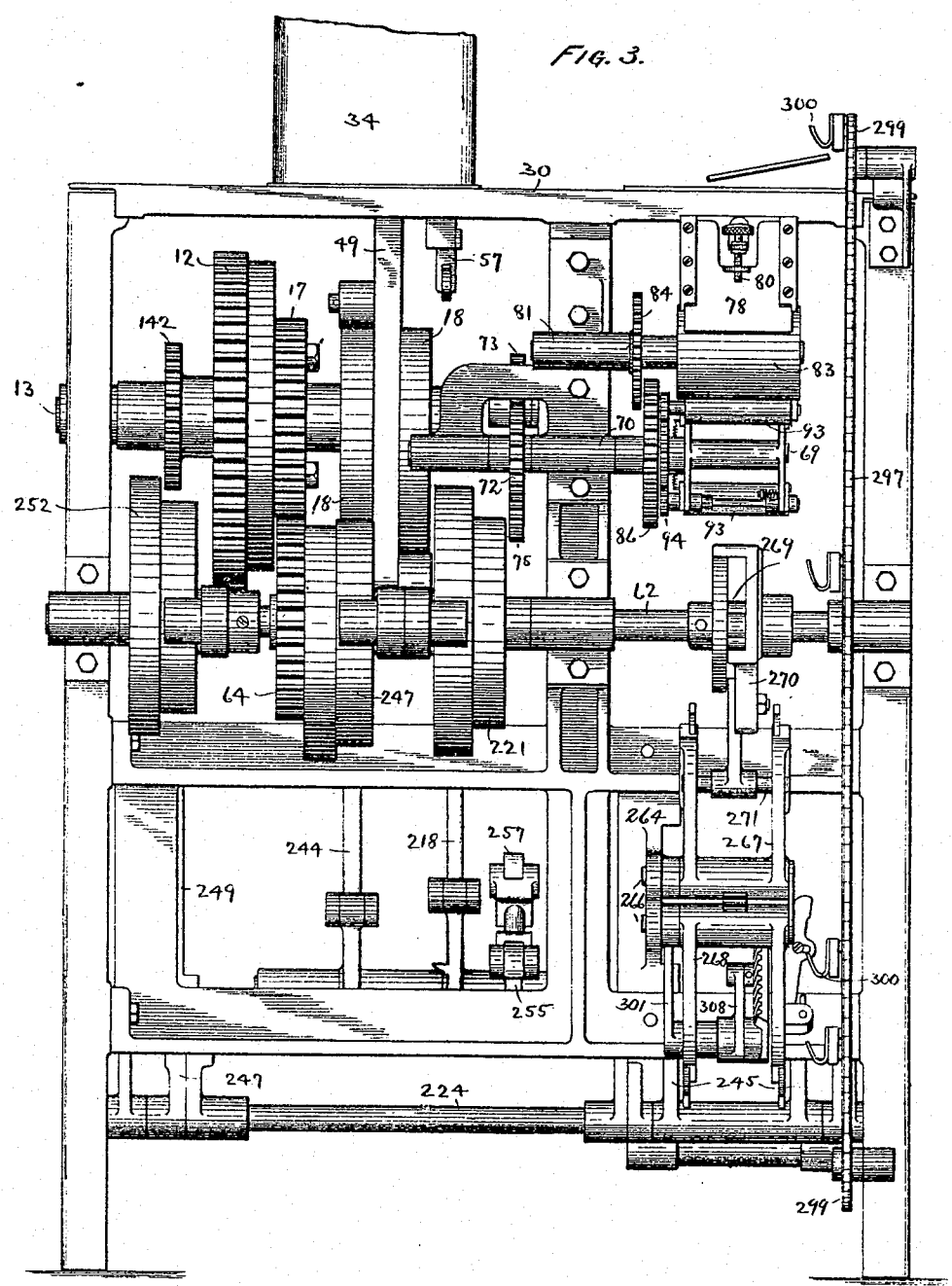

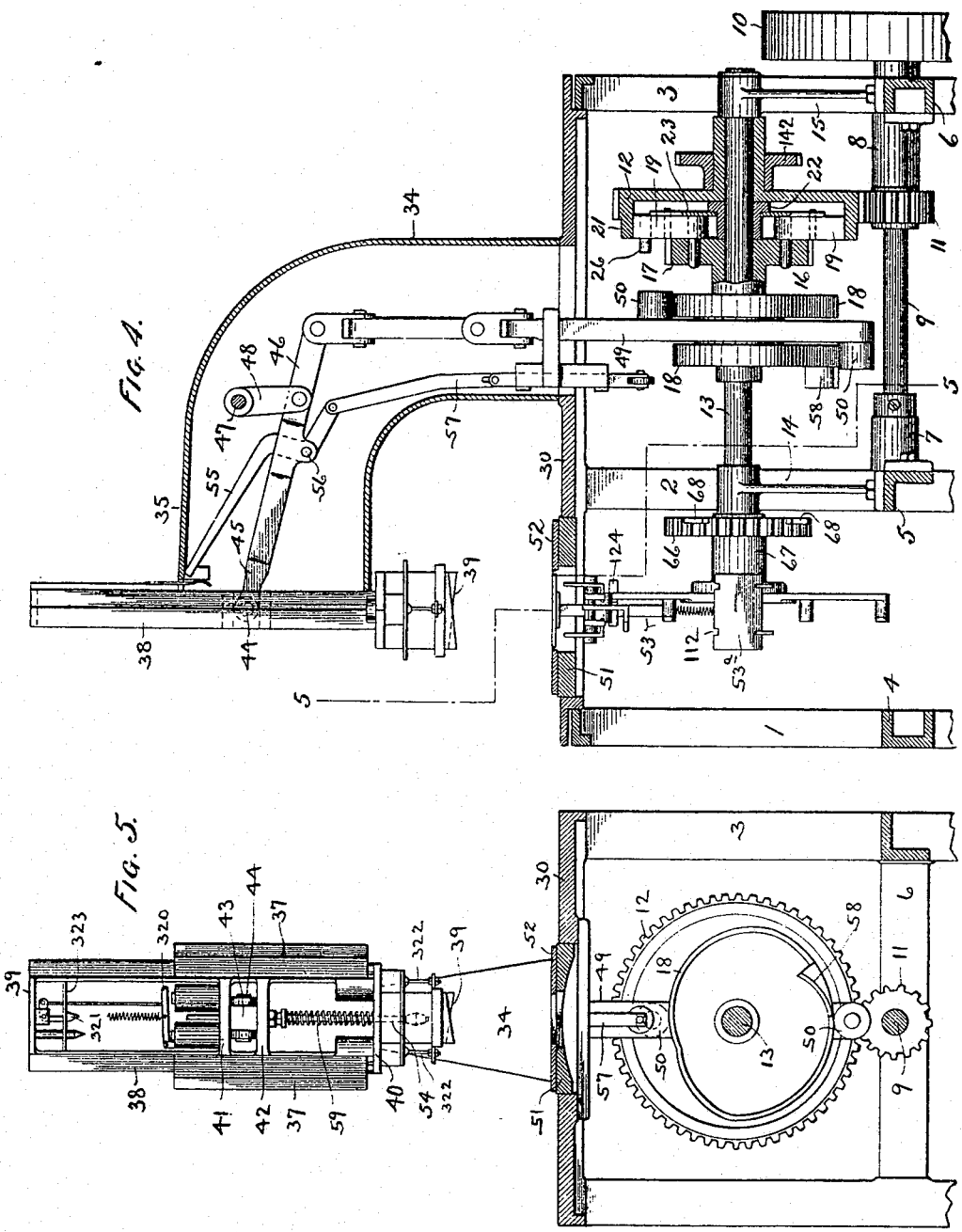

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.

18 SHEETS—SHEET 5.

WITNESSES.
H. B. Hallock
L. H. Monson

INVENTOR.
Alfred H. Randall Jr.
By
W. Preston Williamson
Atty

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 6.

WITNESSES.
H B Hallock
L. H. Morrison

INVENTOR.
Alfred H. Randall Jr.
By

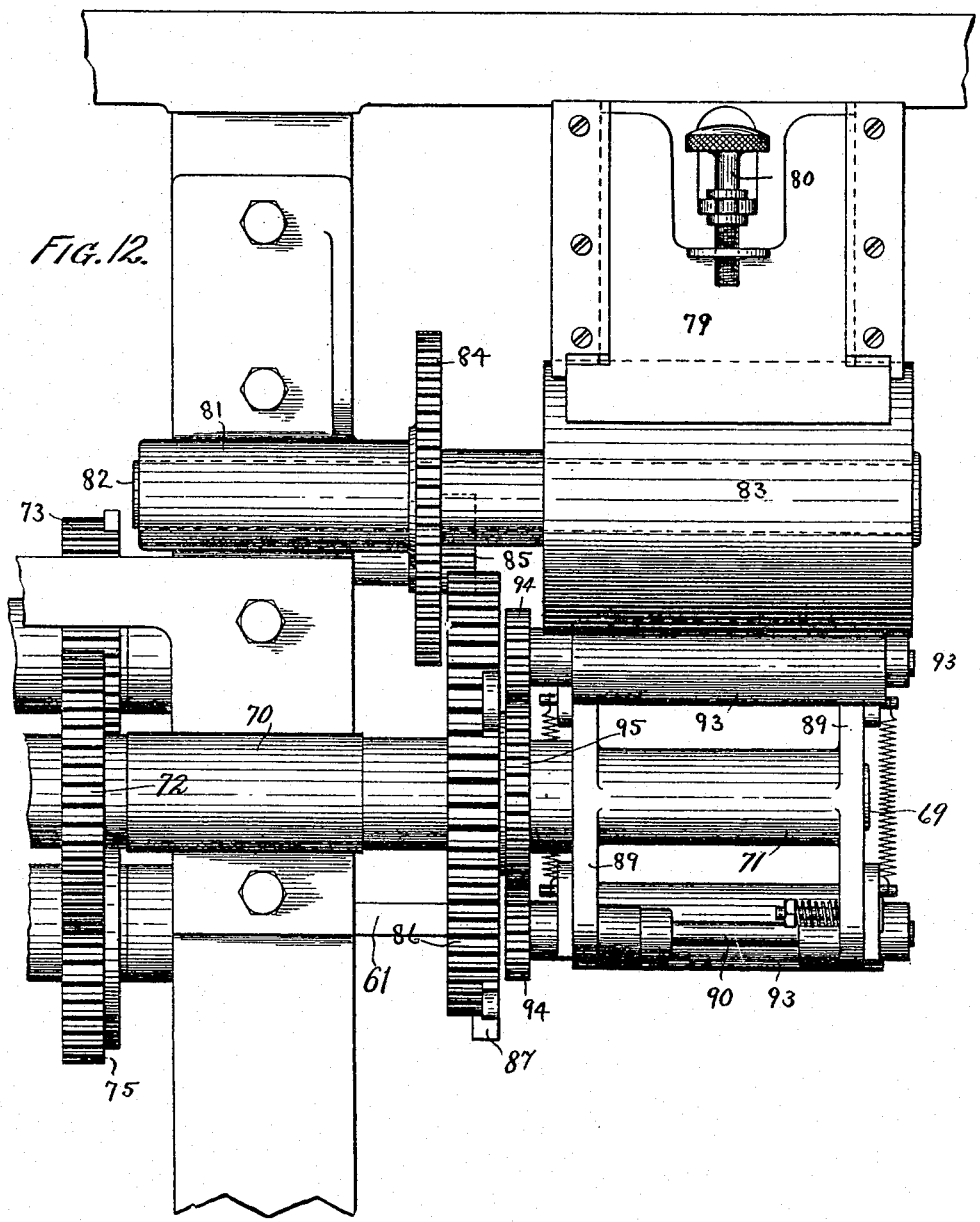

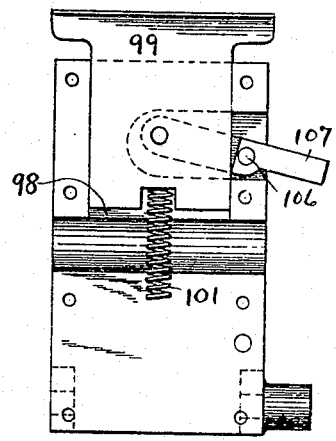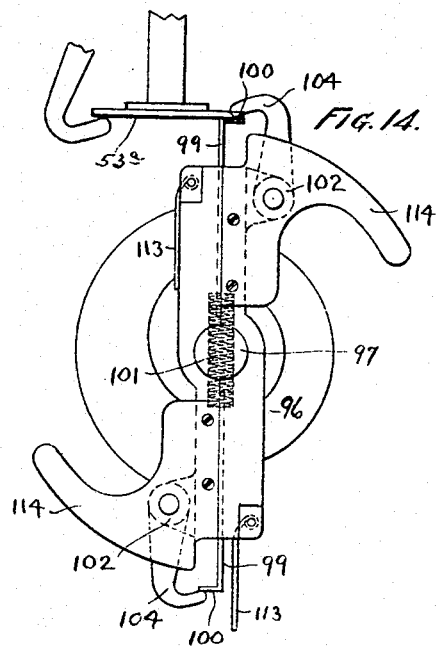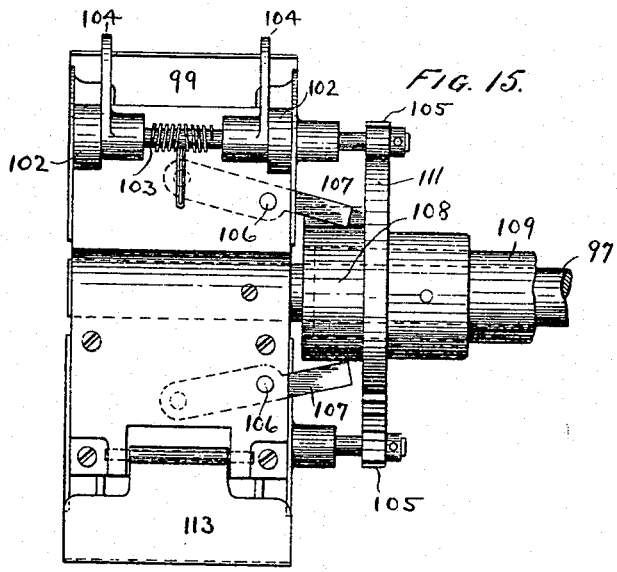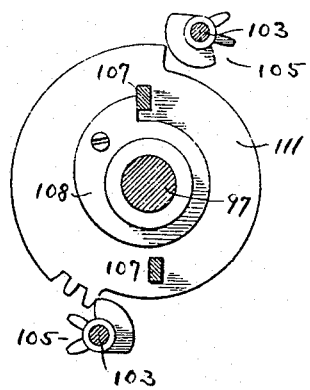

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 9.
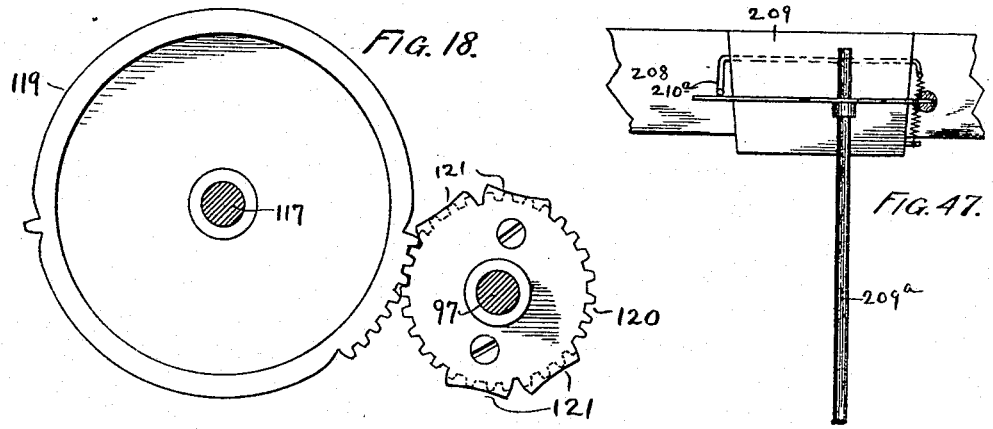
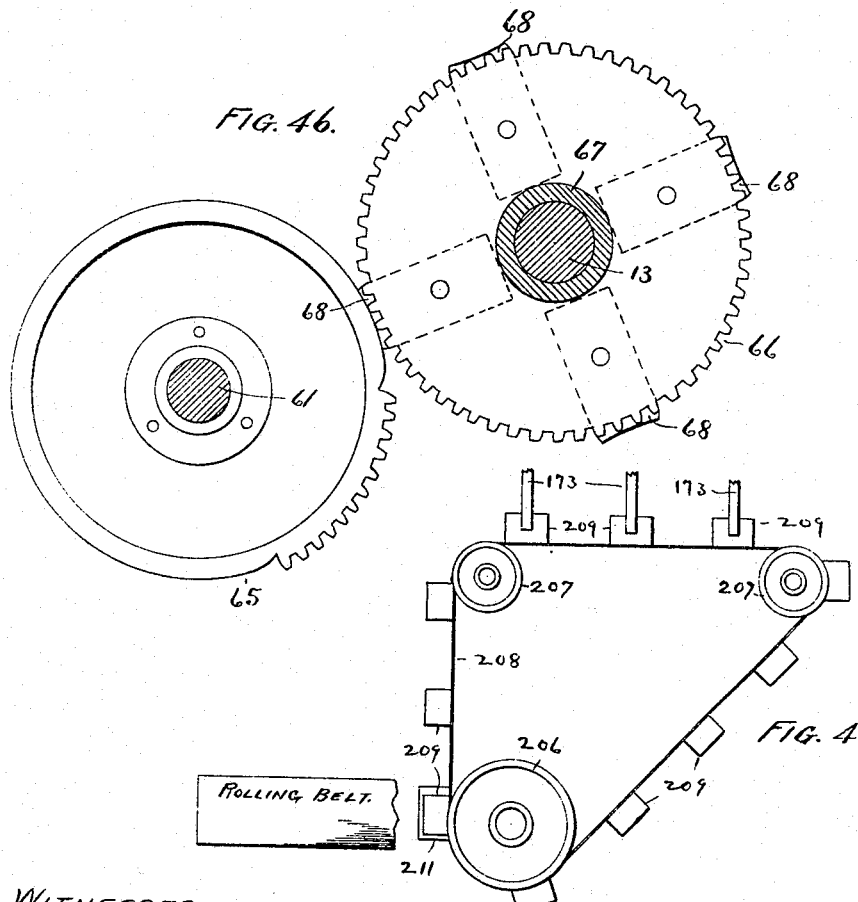
WITNESSES.
INVENTOR No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 10.
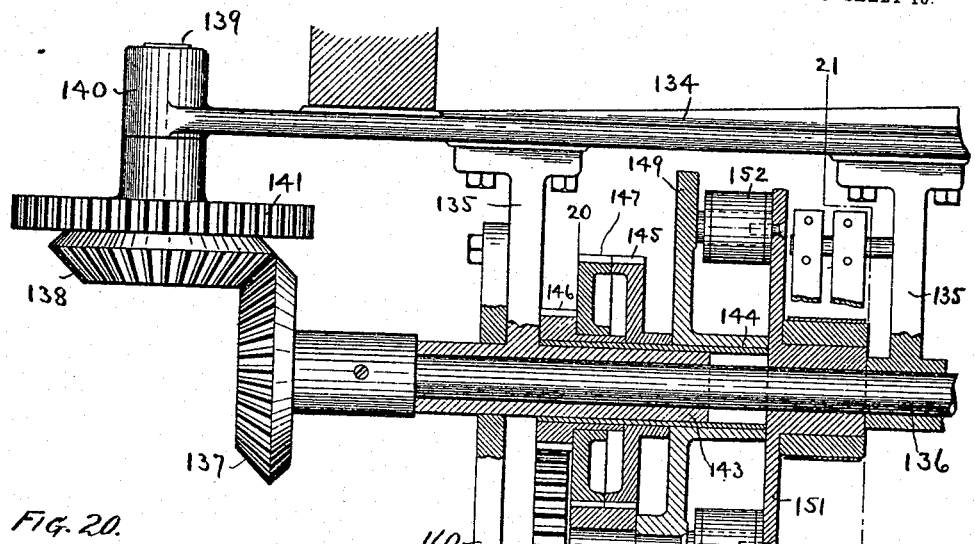

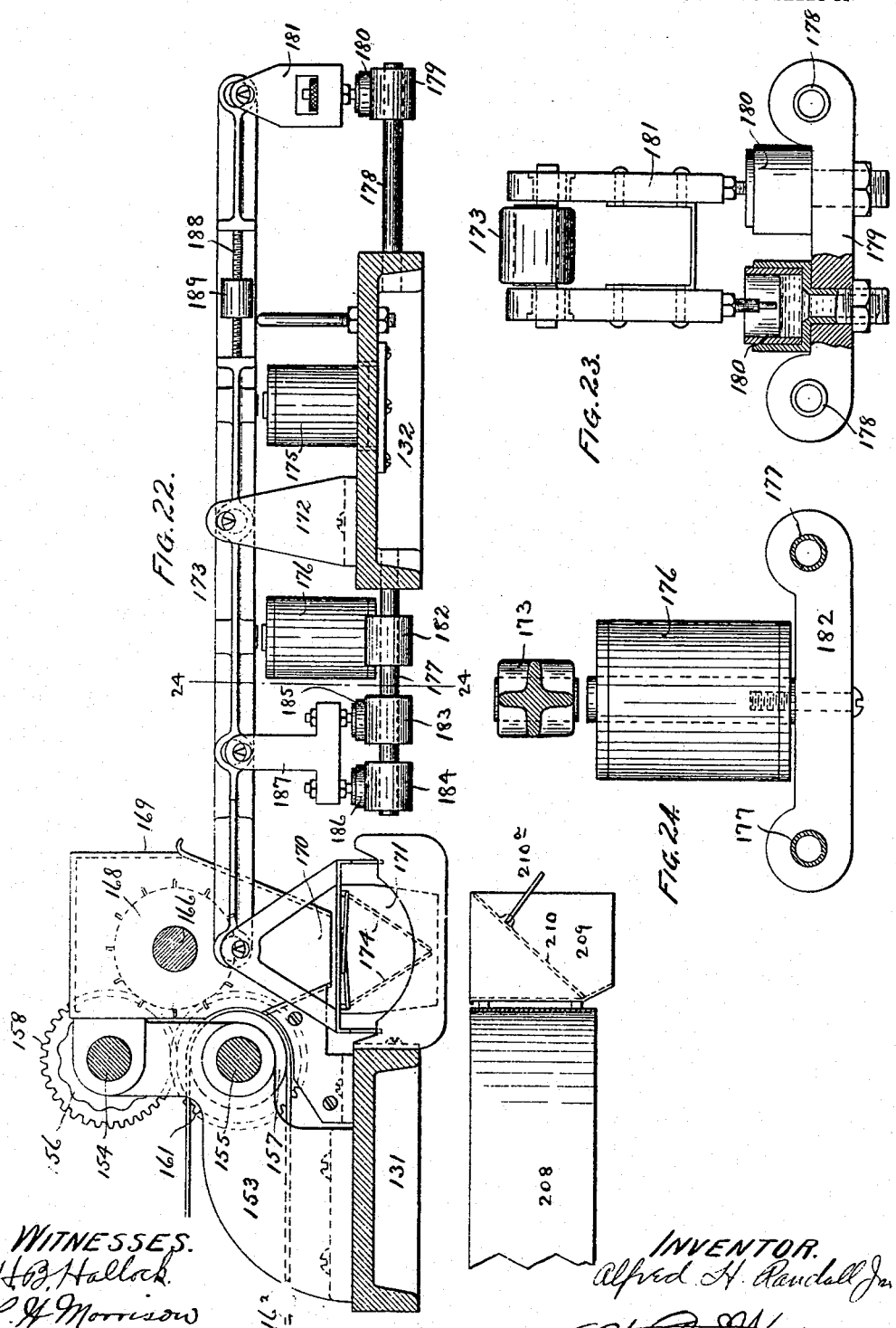

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 12.
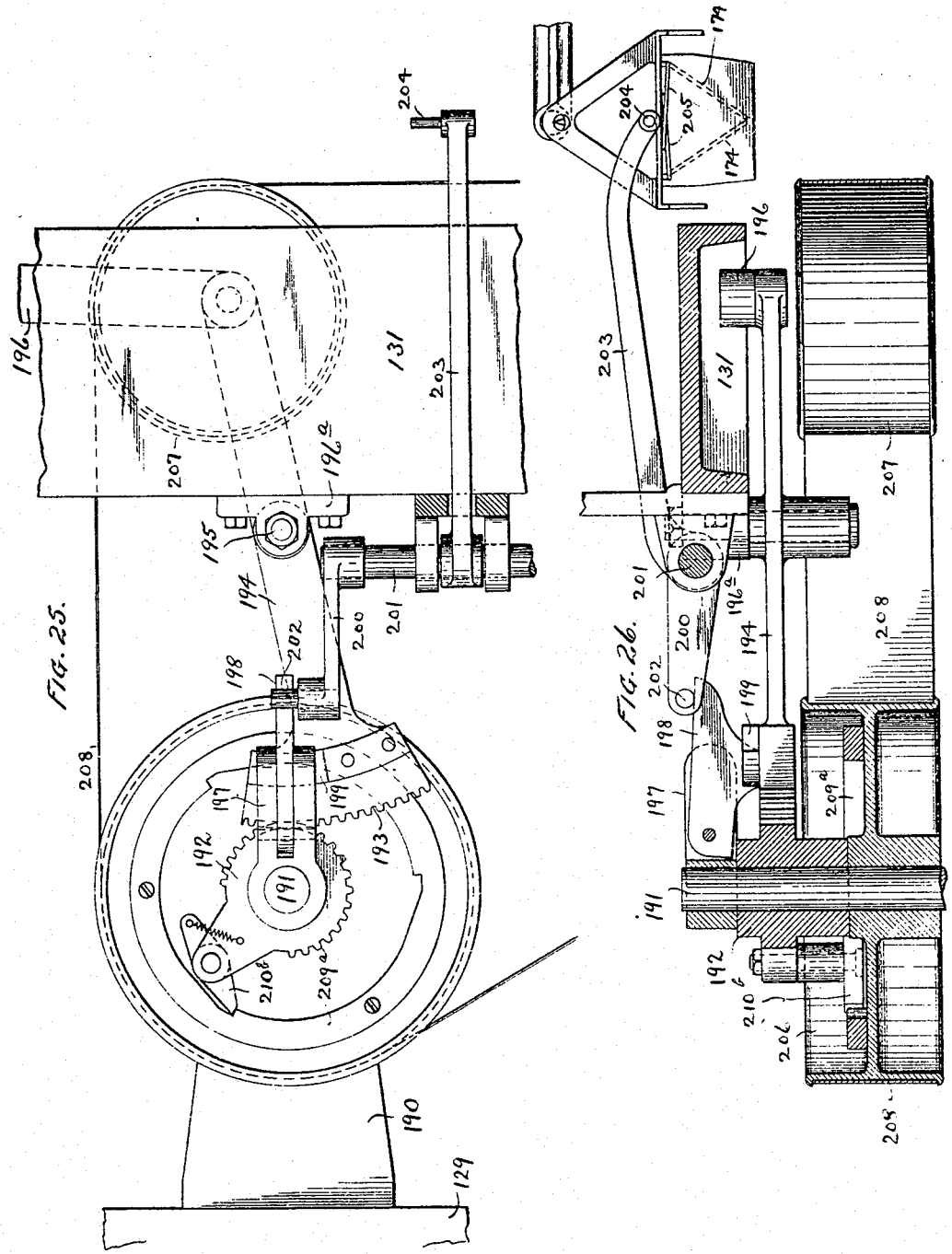
WITNESSES.
H B Hallock
L. H. Morrison
INVENTOR.
Alfred H. Randall Jr.
By W Preston Williamson
Atty.

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 13.

FIG. 28ª.

WITNESSES.
H. B. Hallock
L. H. Morrison

INVENTOR.
Alfred H. Randall Jr.
By
W. Preston Williamson

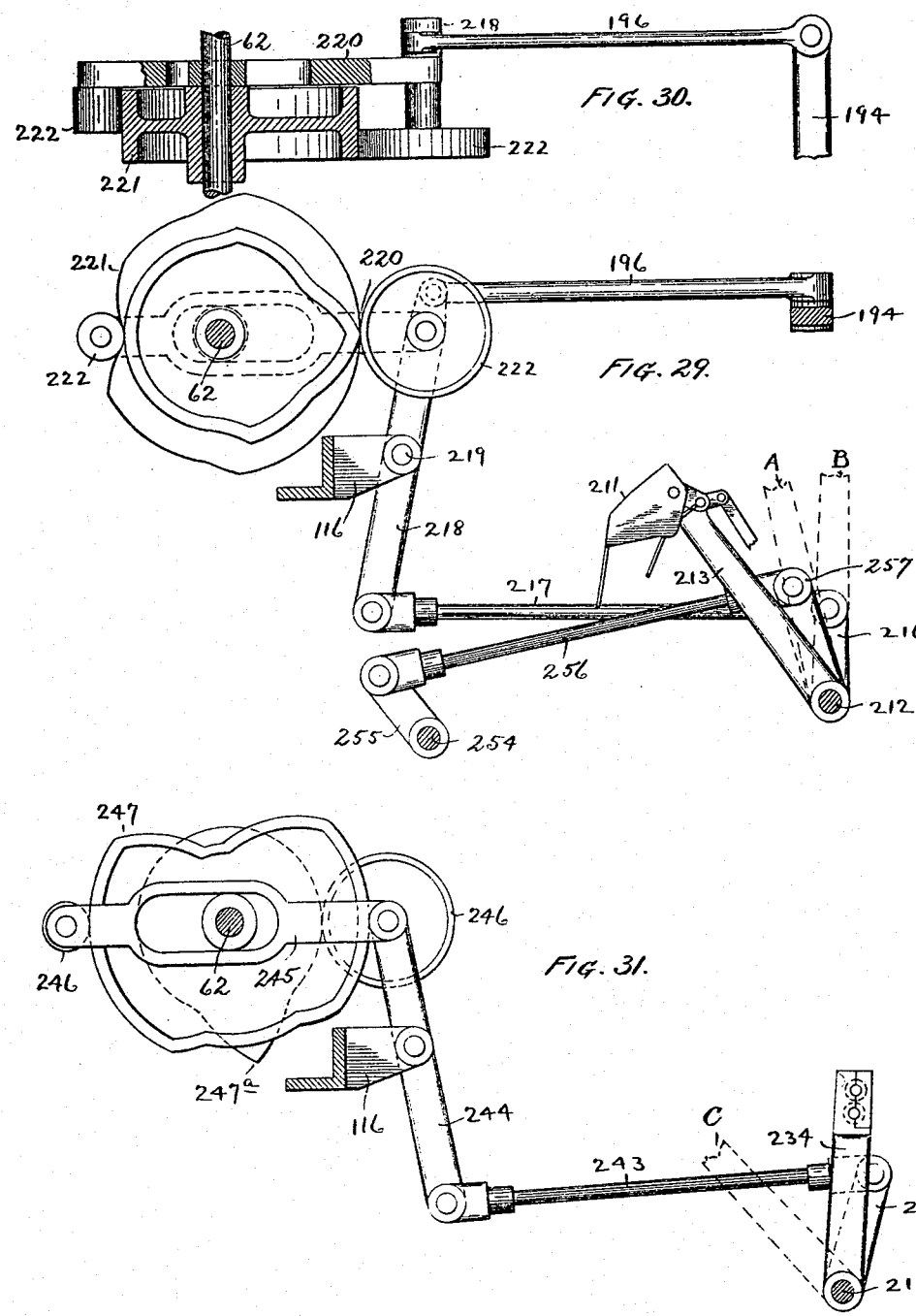

No. 812,152. PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 15
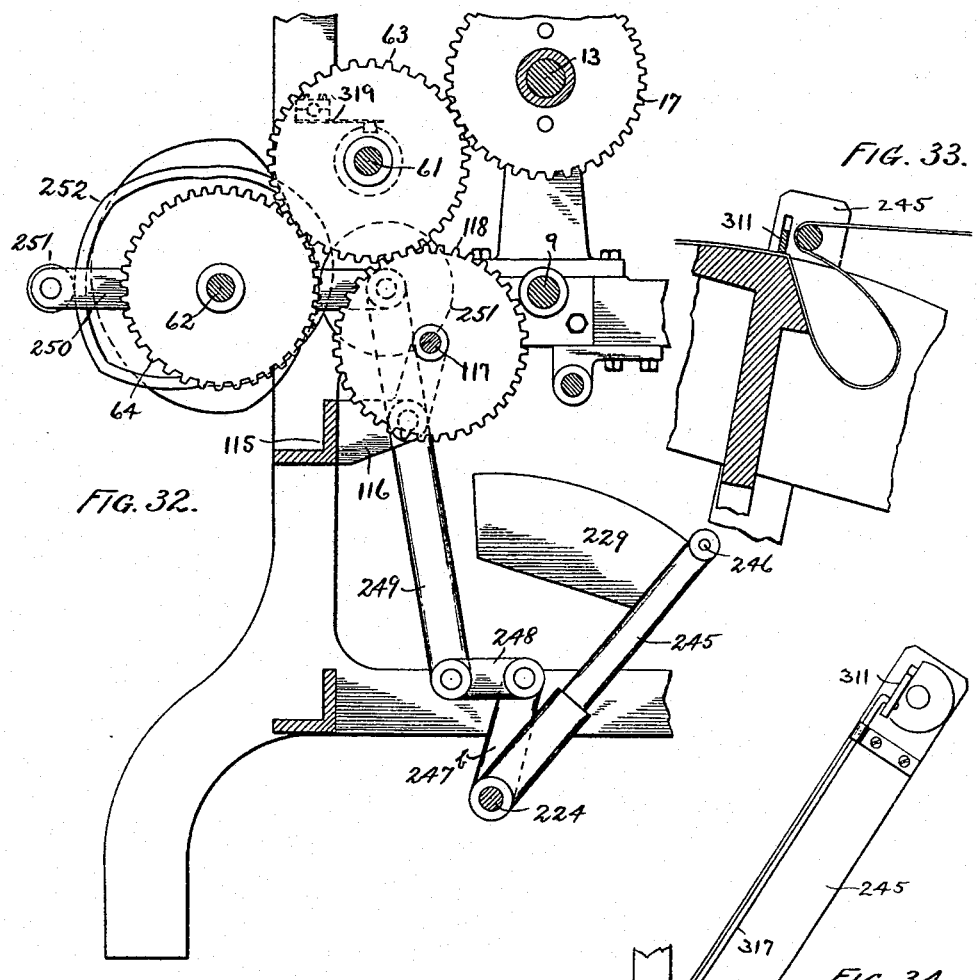
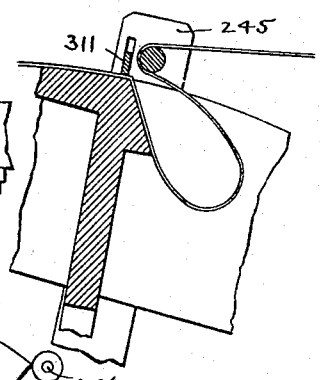
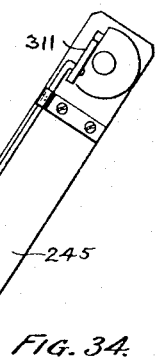
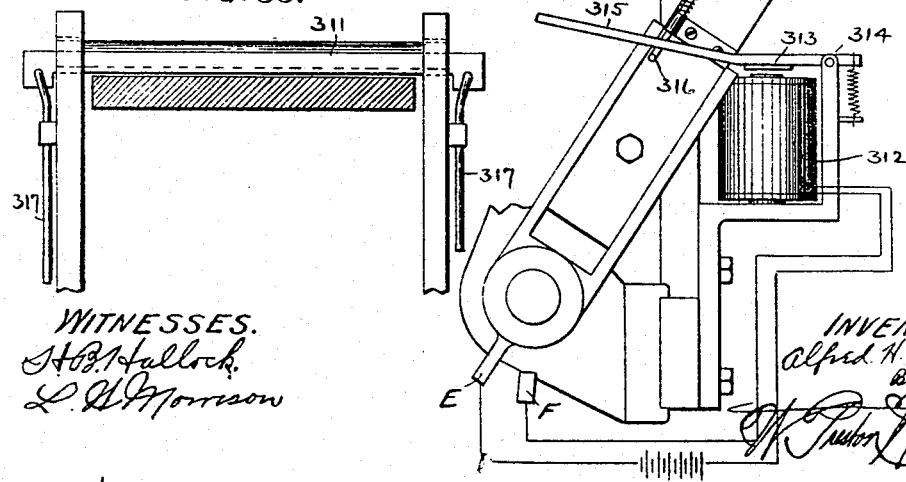

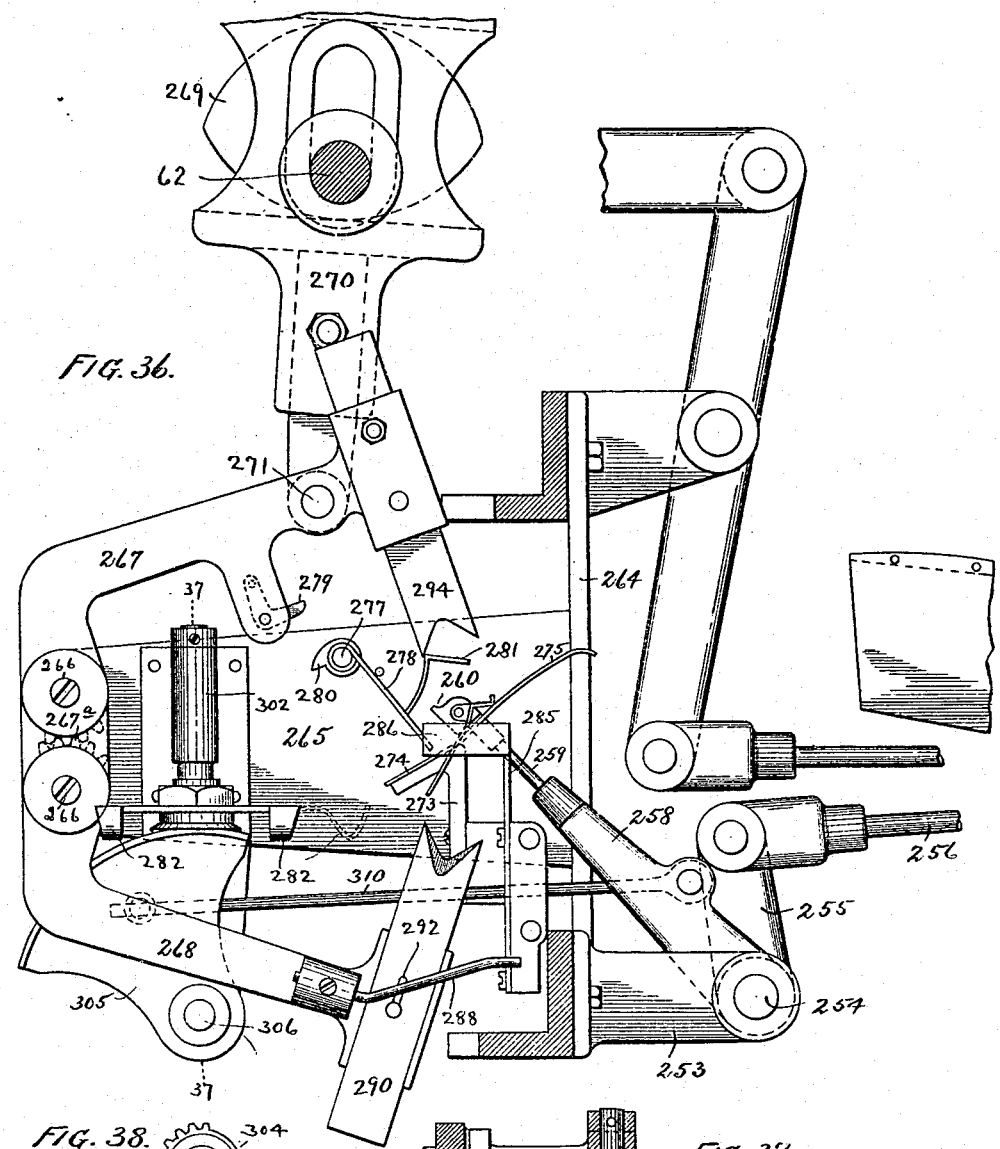

No. 812,152.
PATENTED FEB. 6, 1906.
A. H. RANDALL, Jr.
MACHINE FOR MAKING ALL TOBACCO CIGARETTES.
APPLICATION FILED OCT. 11, 1904.
18 SHEETS—SHEET 17.
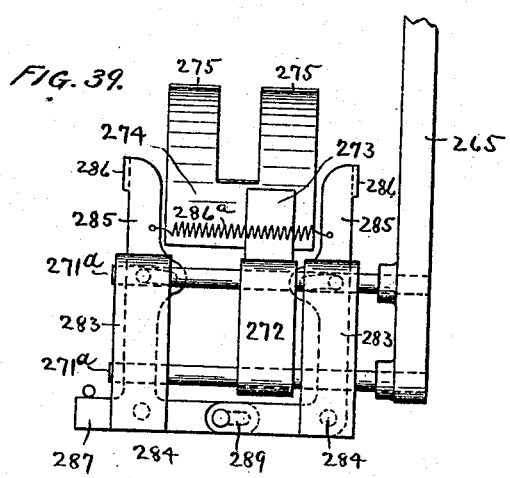
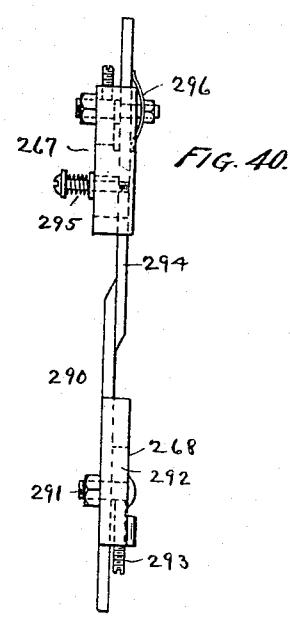
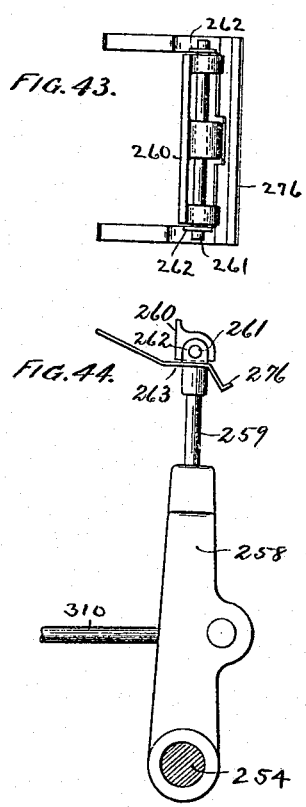
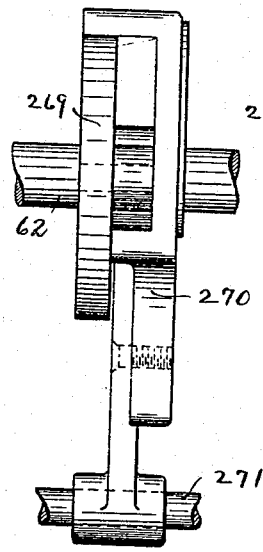
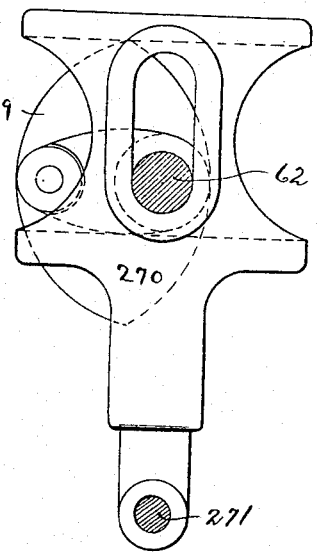
WITNESSES.
H. O. Hallock
L. A. Morrison
INVENTOR.
Alfred H. Randall Jr.
By
W. Preston Williamson
Atty

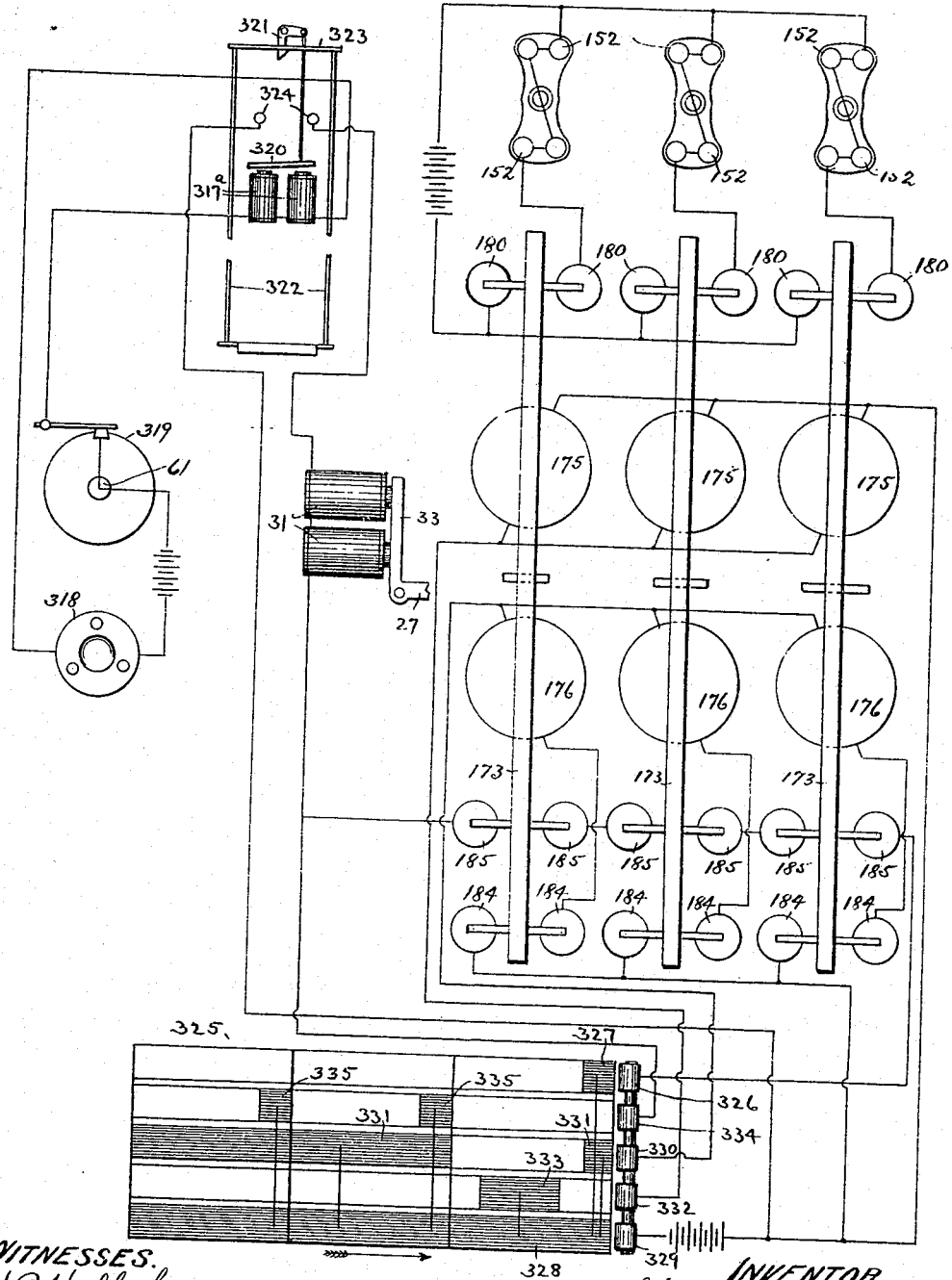

UNITED STATES PATENT OFFICE.

ALFRED H. RANDALL, JR., OF PHILADELPHIA, PENNSYLVANIA, ASSIGNOR OF ONE-HALF TO PEMBROKE D. HARTON, OF PHILADELPHIA, PENNSYLVANIA.

MACHINE FOR MAKING ALL-TOBACCO CIGARETTES.

No. 812,152.     Specification of Letters Patent.     Patented Feb. 6, 1906.

Application filed October 11, 1904. Serial No. 227,982.

*To all whom it may concern:*

Be it known that I, ALFRED H. RANDALL, Jr., a citizen of the United States, residing at Philadelphia, county of Philadelphia, and State of Pennsylvania, have invented a certain new and useful Improvement in Machines for Making All-Tobacco Cigarettes, of which the following is a specification.

My invention relates to a machine for making all-tobacco cigarettes, and is an improvement of the mechanism shown in my Patent No. 669,548, of March 12, 1901, and has for its object to increase the capacity of the machine, which object I have accomplished by the employment of several scales or weighing apparatuses, as I have found that more time is required to properly weigh the filler than to cut, paste, and feed the wrapper thereto or to roll, trim, and transfer the cigarette from the machine. Consequently I have provided mechanism for cutting, pasting, and transferring the wrapper to the rolling-table and for rolling, cutting, and transferring the cigarette from the machine which are designed to perform these operations in a minimum length of time and to handle the wrapper and cigarettes successively one by one and for weighing a plurality of the filler-loads, which operation of weighing can be prolonged, if necessary, to secure a balance of the scales until a number of cigarettes is made equal to the number of scales employed, the mechanism being properly timed in its several operations, so that the act of completion of one operation shall serve as a means to actuate other mechanism.

The invention consists in the parts and combination of parts hereinafter described in the specification, shown in the drawings, and more particularly pointed out in the claims.

Figure 2:
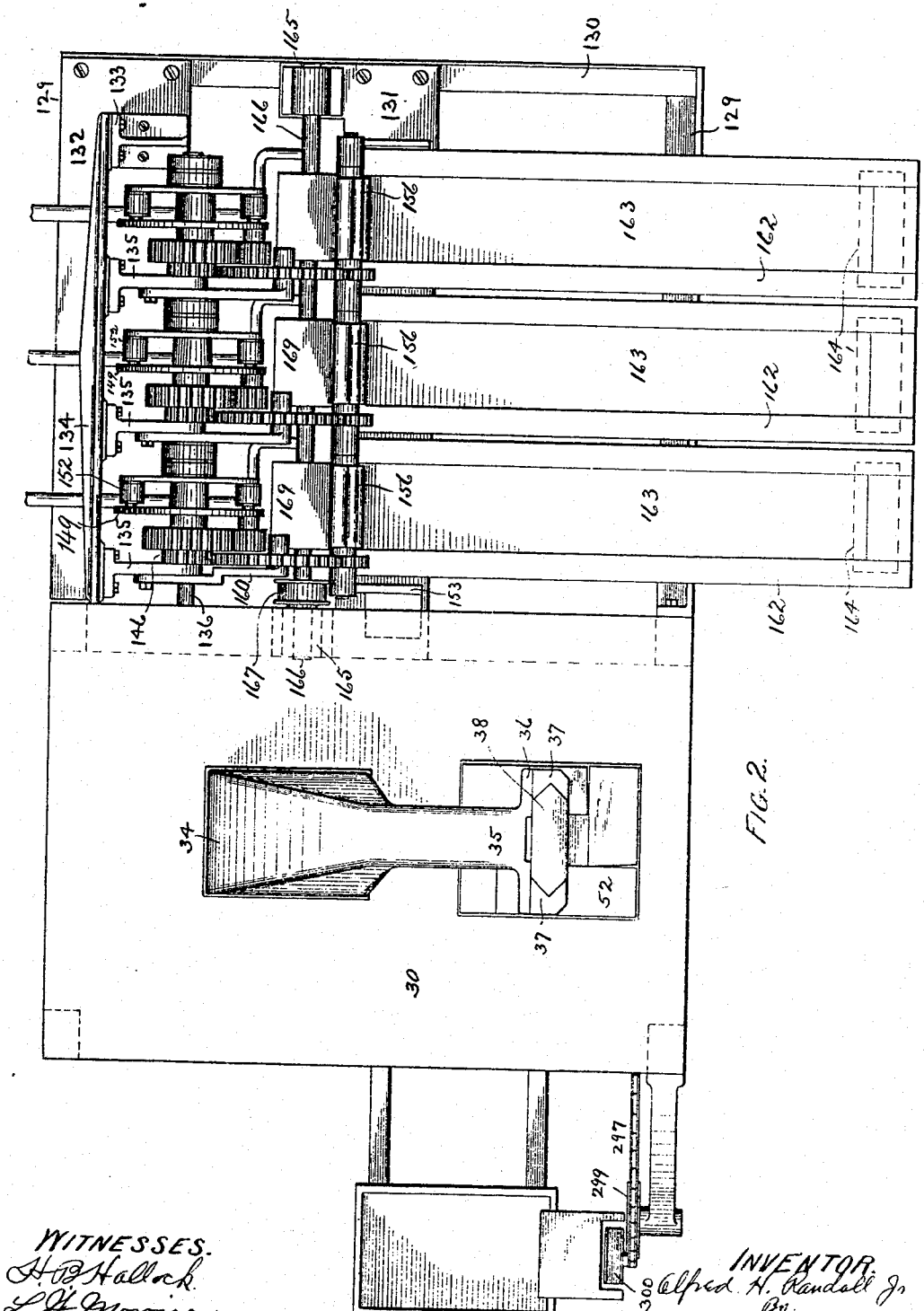
Figure 6:
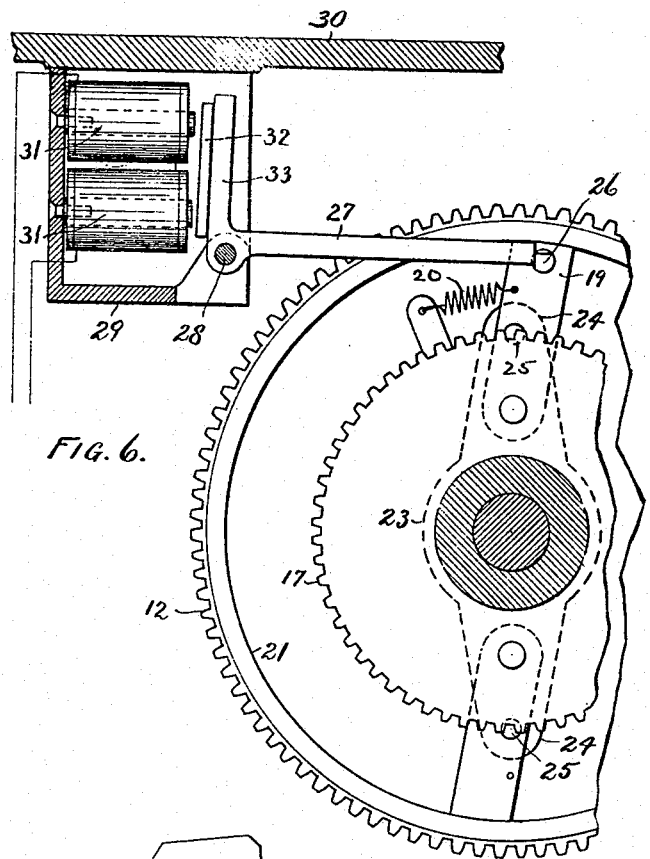
Figure 7:
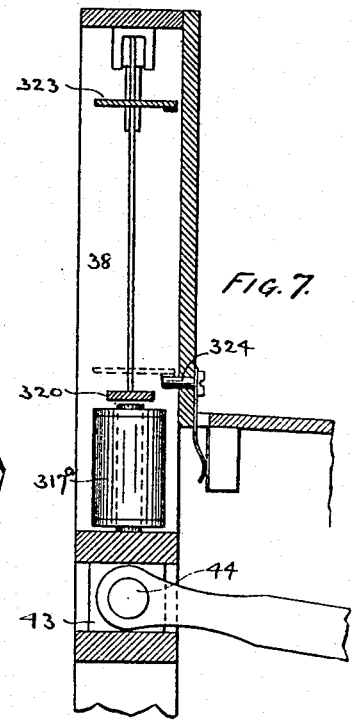
Figure 10:
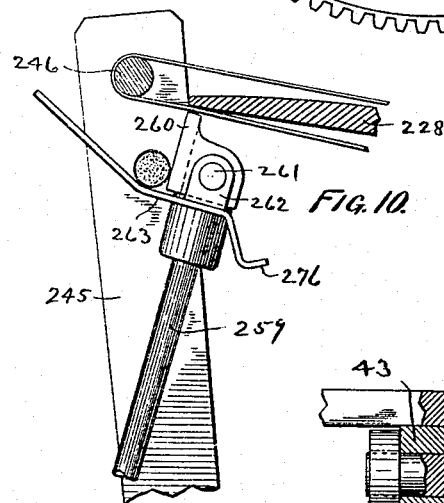
Figure 8:
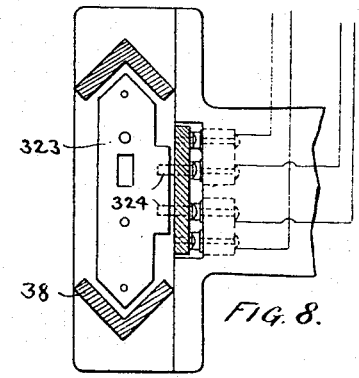
Figure 9:
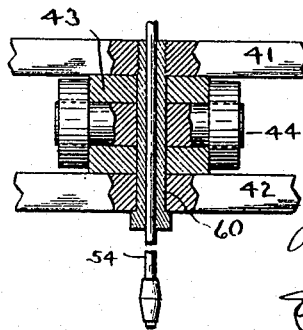
Figures 11, 13:
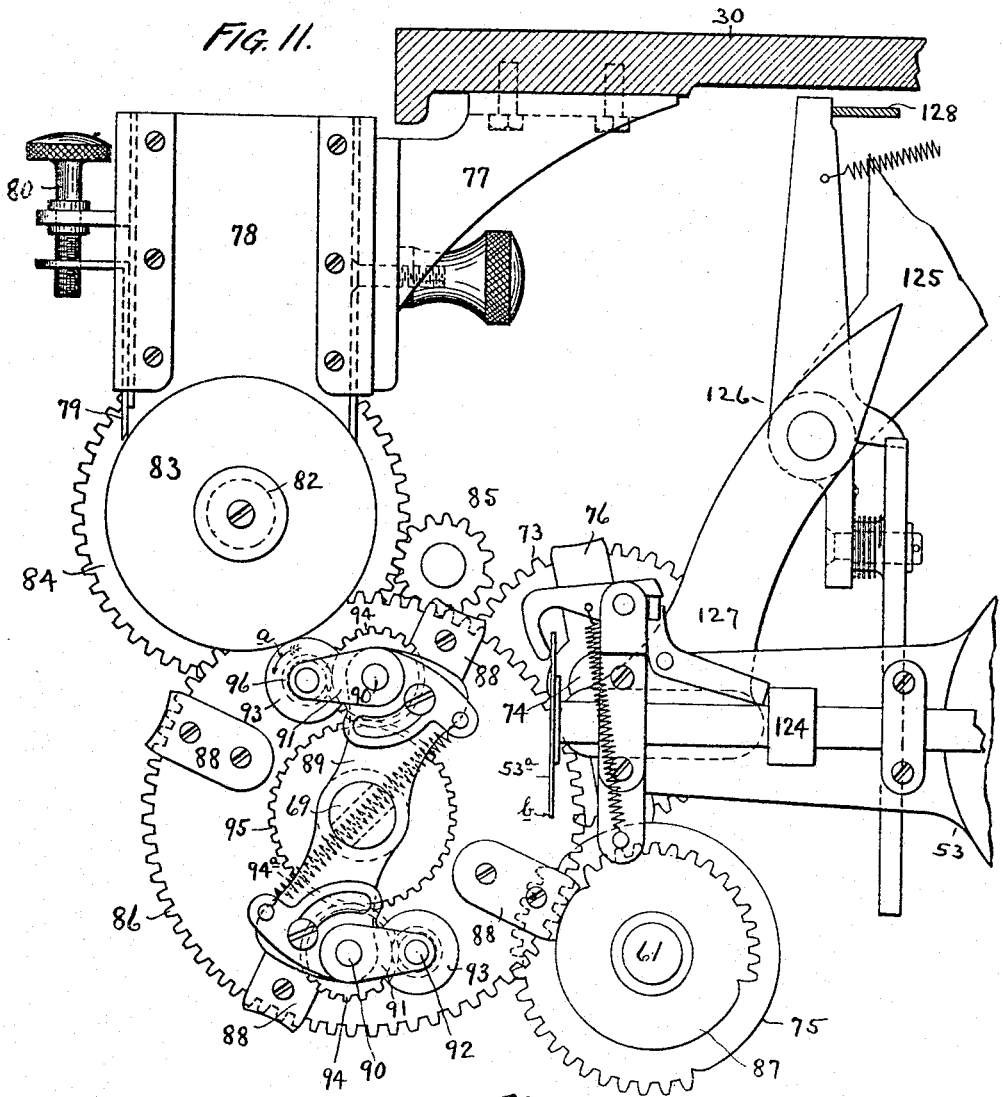
Figures 27, 28:
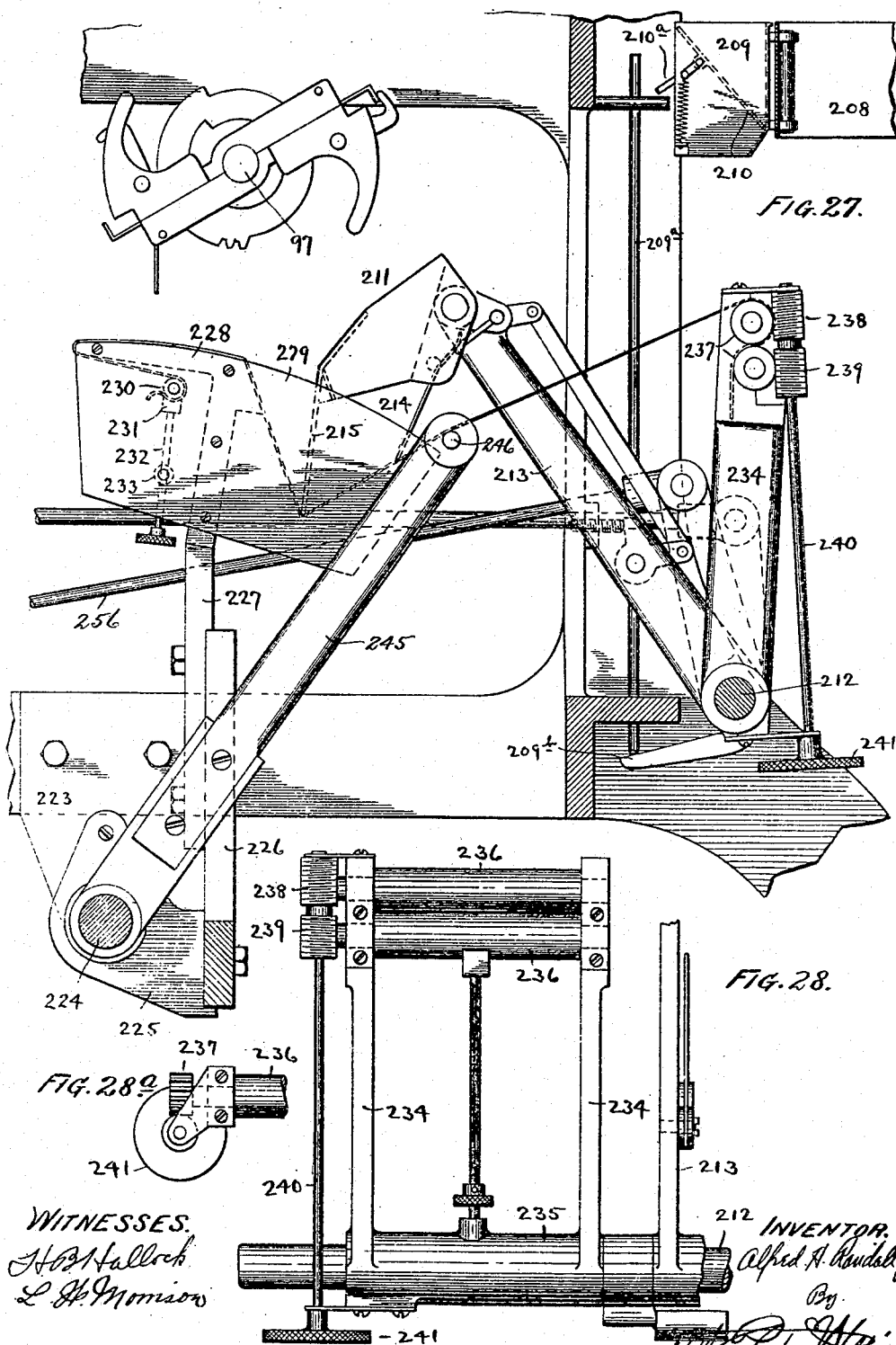

Figure 1 is a front elevation of a complete machine for making all-tobacco cigarettes embodying the essential features of my invention; Fig. 2, a plan view of the same; Fig. 3, a side elevation of the same, the intermediate shaft and the parts connected therewith being removed for the sake of clearness, the position of said shaft being shown clearly in other figures; Fig. 4, a longitudinal vertical section of the machine, showing more particularly the driving mechanism and the cutting mechanism; Fig. 5, a sectional elevation of the same, taken at a point indicated by the line 5 5 of Fig. 4; Fig. 6, a sectional detail view of the main shaft, illustrating the clutch-gear and its operating mechanism; Fig. 7, a partial longitudinal vertical section of the plunger; Fig. 8, a sectional plan view thereof; Fig. 9, a sectional detail view of the central cross-pieces of the plunger, illustrating more particularly the connection with the operating-lever and of the supplemental plunger therewith; Fig. 10, an enlarged sectional detail of a portion of the rolling-table, the rolling-arm and roller, and the cigarette-transfer, this view being more specifically designed to illustrate the scraping action of the transfer mechanism with the rolling-belt when the transfer mechanism is in a position to receive the cigarette from the rolling-belt; Fig. 11, a front elevation of the pasting mechanism, showing the relation of the wrapper-carrier thereto; Fig. 12, a side elevation thereof; Fig. 13, a detail view of the gear mechanism for revolving the paste-rolls; Fig. 14, a detail view, in front elevation, of the wrapper-transfer mechanism; Fig. 15, a side elevation of the same; Fig. 16, a sectional detail view of the operating mechanism therefor; Fig. 17, a detail view of one of the sides of the wrapper-transfer; Fig. 18, a detail view of the mutilated gearing for operating the wrapper-transfer; Fig. 19, a detail sectional plan view of the mechanism for operating the filler-feed mechanism; Fig. 20, a sectional view of the same on lines 20 20 of Fig. 19; Fig. 21, a like view of the same on lines 21 21 of Fig. 19; Fig. 22, a detail view of the filler feed-rolls, the filler separator, picker, and the scale; Fig. 23, a rear elevation of the scale; Fig. 24, a sectional view of the scale on lines 24 24 of Fig. 22; Fig. 25, a plan view of the mechanism for opening the scale-pockets and the mechanism for carrying the filler from the scales to the mechanism for transferring the same to the rolling-belt; Fig. 26, a sectional elevation of the same; Fig. 27, a sectional front elevation of a portion of the machine, illustrating the rolling-table and the relation of the wrapper-transfer, the rolling-belt, the slack take-up, the filler-transfer, and the rolling mechanism therewith; Fig. 28, an elevation of the slack take-up; Fig. 28ª, a plan view of one of the sides thereof; Fig. 29, a sectional detail view of the filler-transfer arm and the mechanism for rocking the same. Fig. 30 is a partial sectional plan view; Fig. 31, a detail view of the slack-take-up arm and the means for rocking the same; Fig. 32, a sectional detail view of a portion of the machine, showing more particularly the rolling mechanism and the means for rocking the same. Figs. 33, 34, 35 are detail views of the modification of the rolling mechanism; Fig. 36, a sectional front elevation of the cigarette-trimming mechanism; Fig. 37, a sectional detail view of the same on line 37 37 of Fig. 36; Fig. 38, a plan view of the mutilated gears for operating the transfer-buckets which transfer the cigarette to the elevating mechanism; Fig. 39, a detail view of the mechanism shown in Fig. 36 for centering the cigarette upon the cutting-table; Fig. 40, a detail view of the cutting-knives. Figs. 41 and 42 are detail views of the cams for operating the cutting-knives. Figs. 43 and 44 are detail views of the mechanisms for transferring the cigarettes from the rolling-table to the cutting-table; Fig. 45, a diagrammatic illustration of the controlling mechanism for the machine; Fig. 46, a detail view of the mutilated gears between the intermediate shaft and the wrapper-carrier; Fig. 47, a detail view of the means employed to open the door of the filler-carrier buckets; Fig. 48, a diagrammatic illustration of the filler-carrier.

In carrying out my invention I employ a frame consisting of a front, an intermediate, and rear uprights 1, 2, and 3, respectively, having lateral cross-rails 4, 5, and 6 and journaled in suitable bearings 7 and 8. Secured to the cross-rails 5 and 6 is the driving-shaft 9, upon which is secured the driving-pulley 10, receiving motion from the counter-shaft (not shown) and a pinion 11, which meshes with a clutch-gear 12, loosely journaled upon a main shaft 13, fixedly secured in stands 14 and 15, carried by the intermediate and rear cross-rails 5 and 6. The driving-shaft, and consequently the clutch-gear, have a continuous revolution. Loosely journaled upon the main shaft 13 is a combined clutch-gear and cam 16, comprising a gear 17 and a pair of cams 18 18, Figs. 4 and 5, and pivotally secured in the gear 17 at their inner ends are clutch-arms 19, Fig. 6, the outer free ends of which are normally projected forward by means of the spring 20, one end of which is secured to one arm 19 and the other end to an extension of the gear 17. The clutch-gear 12 is formed with an annular flange 21, forming a recess in which the clutch-arms are housed, the clutch-arms contacting with the inner face of the flange when projected.

Secured upon the shaft 13 between the web of the clutch-gear and the gear 17 is a flange-collar 22, which properly spaces the clutch-gear and the gear 17, and upon said collar is loosely journaled a disk 23, having oppositely-projecting arms 24, and projecting through the outer end of said arms and through orifices in the clutch-arms are pins 25, whereby when one of the clutch-arms is moved the opposite clutch-arm is correspondingly moved. Projecting from the outer end of one of the clutch-arms is a pin 26, which in its path of travel normally abuts against the end of an arm 27, pivotally secured at 28 in a box 29, secured to the under side of a table 30, which is secured to the upper ends of the frames 1, 2, and 3.

As shown in Fig. 6, the arm 27 is in its lowered position and in engagement with the pins 26, the said arm being raised by means of magnets 31, secured in the box 29 when said magnets are energized, there being an armature 32 secured upon the right-angled end 33 of the arm 27 in alinement with the cores of the magnets. When the arm is raised and the pin is released, the springs force the outer end of the clutch-arms into engagement with the clutch-face of the clutch-gear and the revolution of the clutch-gear is imparted to the gear 17 and the cams 18 until the magnet is demagnetized and the lever 27 allowed to drop into the path of travel of the pin 26, which occurs when the gear 17 and the cams 18 have made a complete revolution.

Secured to the table is a hollow standard 34, Figs. 4 and 5, which projects forward at its upper end, as at 35, and is provided with side wings 36, to which are secured two guides 37. Sliding vertically in the guides is a plunger 38, which carries on its lower end a punch 39. The plunger 38 is formed with elongated sides joined at the top and bottom by webs 39 and 40, respectively, and at points intermediate of their length by cross-pieces 41 and 42. Located between the cross-pieces 41 and 42 is a block 43, through which passes a pin 44, and journaled upon the outer ends of said pin is a bifurcated end 45 of an arm 46, which operates the punch. Pivotally secured upon a pin 47, fastened in the sides of the standard 34, is a link 48, and to the lower end of the link is pivotally secured the arm 46, the link acting as a fulcrum for the arm, and pivotally secured to the rear end of the arm is a cam-lever 49, carrying rollers 50, which bear upon the cams 18. Consequently as the cam is revolved a complete revolution the plunger is reciprocated from its upper position to the die and raised again to its upper position, in which position it remains until the magnets 31 are again energized. Arranged in the table in alinement with the movement of the punch is an opening, and secured therein is a plate 51, having an opening substantially larger than the cross-sectional area of the punch, and secured upon the plate are the knives 52, which form the die. Secured upon the forward end of the shaft 13 is the carrier 53, which receives the cut wrapper from the plunger. Said carrier is the same as shown in my former patent, No. 669,548, before mentioned, and therefore I do not deem it necessary to go into an extended explanation of this part of the mechanism, as it is the same as in my former patent, consisting of four radial arms guiding four radial sliding plungers, which plungers tend to be forced outward by springs, the outer end of the plungers being provided with plates 53$^a$, adapted to receive the wrapper, the plunger at the top of the carrier being pressed inward when it receives the wrapper and automatically latched, and the carrier is provided with latches which at the same time automatically grasp the wrapper and hold it in contact with the plate, and said plunger remains retracted and the latches remain in contact with the wrapper while the carrier revolves and the wrapper is pasted and while it revolves still further to the point where the wrapper is transferred to the rolling-table. At this time the plungers are retracted still further and then returned to their former retracted position after the wrapper has been removed, and the plunger remains in the retracted position until the carrier has been revolved to bring this particular plunger to the uppermost position again, when the catch is automatically released and the plunger allowed to spring outward, and the catches which hold the wrapper to the plate are forced away from the plate until the plunger is again depressed, and in order to release the wrapper after it has been cut and force the same upon the carrier I have provided a supplemental plunger 54, (see Figs. 5 and 9,) which must of necessity make its stroke after the plunger 38 has completed its stroke. I have therefore provided a supplemental lever 55, Fig. 4, pivotally secured at 56 to the lever 46, the rear end of said lever being pivotally secured to a plunger 57, having its lower end in the path of travel of a cam-face 58, projecting forwardly from the forward cam 18, said cam-face 58 being located upon the cam 18 at the highest point of the cam to operate the lever 55 and to depress the supplemental plunger when the plunger 38 is down. The supplemental plunger 54 is normally held in a raised position by a spring 59, surrounding a plunger and interposed between a washer thereon and the web 40, the plunger being guided by the web 40 at its lower end and a bolt 60, through which it passes, at the upper end. The bolt 60 passes through an orifice in the cross-piece 42, block 43, the bolt 44, and screws into the cross-piece 41 after the plunger 39 has been forced downward by the lever 46 and the cam-face 58 strikes the lower end of the plunger 57. Then the lever 55 will be operated so as to force its forward end downward upon the top of the supplemental plunger 54, which will force the lower end of this plunger downward upon the wrapper, and thus depress the carrier-plate 53$^a$ to a position where it is caught by its catch, so that said carrier-plate and stem will be held in this retracted position.

Journaled in suitable bearings upon the frame is a shaft 61, Fig. 32, which I will designate the "intermediate" shaft, and the shaft 62 I will designate the "cam-shaft," and secured upon the intermediate shaft is a gear 63, which meshes with the gear 17, heretofore described, and secured upon the cam-shaft is a gear 64, which meshes with the gear 63, whereby as the gear 17 and the cams carried thereby make one revolution the intermediate and the cam shaft also make one revolution. Secured upon the intermediate shaft is a mutilated gear 65, Fig. 46, and journaled upon the shaft 13 is a gear 66, said gear forming part of a sleeve 67, loosely journaled on shaft 13, to which the wrapper-carrier 53 is secured, the gear 66 being provided with four stops 68, which successively engage the mutilated portions of the gear 65, the arrangement of stops 68 being such that the gear 66, and consequently the wrapper-carrier, makes a one-fourth turn upon each complete revolution of the intermediate shaft, the teeth upon the mutilated gear 65 being so positioned that the wrapper-carrier remains stationary with one of the arms under the punch until a wrapper is deposited and secured thereon and is then moved and caused to remain stationary in front of the pasting mechanism until one of the wrappers has been pasted and is then moved to be engaged by the transfer. The pasting mechanism consists in a stud-shaft 69, Figs. 11 and 13, journaled in a bearing 70, secured to the side frame, which carries on its forward end a paster-frame 71 and on its rear end a gear 72, said gear meshing with a gear 73, carried upon a stud 74, which in turn engages with a mutilated gear 75, secured upon the intermediate shaft 61. The gear 73 is provided with oppositely-arranged stops 76, which alternately engage the mutilated portion of the gear 75. Consequently upon each revolution of the intermediate shaft the paster-frame is given a one-half revolution and one of the paste-rollers is moved from a point in contact with the paste-feed drum to contact and deposit paste upon the wrapper. Secured to the under face of the table 30 is a bracket 77, and removably secured to the bracket is a paste-box 78, and arranged in the forward side of said paste-box is a gate 79, adjusted vertically by a screw 80. Secured to the side frame above the bearing 70 is a bearing 81, in which is secured a stud-shaft 82, and journaled upon the stud-shaft is a paste-feed drum 83, said drum contacting with the paste in the paste-receptacle, which adheres thereto as the drum is revolved. Secured upon the rear end of the paste-feed drum is a gear 84, which meshes with an elongated pinion 85, which in turn meshes with a gear 86, journaled upon the stud-shaft 69, and engaging with the gear 86 is a mutilated gear 87 on the intermediate shaft 61, the gear 86 having secured thereon four stop-pieces 88, which successively engage the mutilated portion of the gear 87. Consequently as the intermediate shaft revolves a full-turn gear 86 is revolved one-fourth turn, and the gear 84 is revolved through the medium of the idler 85, and the paste-feed drum is revolved sufficiently to present a surface containing fresh paste to the paste-rolls. The paster-frame comprises a body secured to the shaft 69, having oppositely-arranged arms 89 at each end thereof, and journaled upon the outer end of each pair of arms is a rod 90, upon each end of which at each end of the frame is secured plates 91, carrying upon one end a rod 92, upon which the paste-rolls 93 are secured, a spring 94$^a$ connecting the opposite end of the plate and normally projects the rollers outwardly, the rod 90 acting as a fulcrum for the plates. Secured upon the rod 90 upon one end thereof are pinions 94, which mesh with the gear 95, carried by the sleeve of the gear 86, whereby as the paster-frame is revolved the pinions 94 travel around the gear 95, revolving the pinions 94, and consequently pinions 96, secured upon the rods 92, causing the rolls 93 to be revolved against the paste-feed drum in the direction of the arrow $a$ in Fig. 11, the object being to uniformly distribute the paste on the rolls 93 in contact therewith, whereby when the paste-feed drum is revolved the surplus paste is carried away from the rolls 93, it being understood that the paste-feed drum revolves to present a fresh-pasted surface to the rolls 93 while the paster-frame is in the position shown in Fig. 11, and while this operation is going on the rolls 93 are revolved as the gear 95 moves with the gear 86, and when the drum 83 is stationary and the frame is revolved to present a roll to the edge of the wrapper at $b$ the pinion 94 travels around the gear 95, thus causing the roll 93 to be revolved to present a sufficient amount of surface of the roll 93 to the wrapper to guarantee a proper pasting of the edge thereof. After the wrapper has been pasted the wrapper-carrier revolves a one-fourth revolution, presenting a pasted wrapper to the transfer mechanism, which transfers the wrapper to the rolling-table, and said wrapper-carrier comprises a body 96, secured upon the forward end of a shaft 97, journaled in suitable bearings upon the rear and intermediate cross-pieces. The body 96 of the carrier is formed of two like halves secured together, each of the halves having a recess 98, in which slides a plate 99, the outer edges of said plates being turned at right angles, as at 100, (see Fig. 14,) the plates being normally projected out or away from each other by a spring 101. Projecting from opposite sides of the body are lugs 102, in which is journaled a rod 103, and secured upon the rods 103 are catches 104, and upon the rear ends of the rods are mutilated gears 105. Pivotally secured at 106 in the body 96 are levers 107, the forward end of each lever being pivotally secured to a plate 99, the rear end of the levers abutting against a cam 108, fixedly attached to a projection 109 of the forward bearing of the shaft 97. Consequently upon each one-half revolution of the transfer one of the plates 99 is forced inwardly at a point when it comes under the carrier-arm and springs outwardly against the pasted edge of the wrapper when in its proper position beneath the wrapper. Also carried by the sleeve of the cam 108 is a mutilated gear 111, over which rides the mutilated gear 105, the teeth in the mutilated gear being so positioned as to retract the catches 104 when the plate 99 is forced in and to release the catches when the plate is released, the catches passing through slots 112 in the edge of the wrapper-carrying plate 53$^a$, Fig. 4, to engage with the wrapper.

Pivotally secured to the sections of the body 96 are two plates 113, which swing freely upon their pivots, these plates being designed to swing against the wrapper as the wrapper nears the rolling-table, and secured to the sections of the body 96 are curved arms 114, which travel beneath the wrapper-carrier to force it in position against the plate 53$^a$ to facilitate the transfer of the wrapper by the wrapper-transferring apparatus to the rolling-table. It is obvious that as the wrapper is only held by one edge when the wrapper-carrier is in its lowermost position the wrapper is apt to fall away from the plate 53$^a$ and hang downward, and the swinging plates 113 and the curved arms 114 are for the purpose of bringing the wrapper against the plate 53$^a$ in a flat condition, so that it can be removed in the proper shape by the wrapper-transferring mechanism.

Secured to one of the longitudinal side braces 115 are stands 116, Fig. 32, and carried by one of said stands is a stud-shaft 117, and secured upon said stud-shaft is a gear 118, which meshes with the gear 63 upon the intermediate shaft 61, whereby the movement of the intermediate shaft is imparted to the stud-shaft. The gears 63 and 118 being of the same pitch-diameter, a complete revolution of the intermediate shaft imparts a complete revolution to the stud-shaft. Also carried by the stud-shaft is a mutilated gear 119, Fig. 18, which is in alinement with the gear 120, secured upon the shaft 97, said gear 120 being furnished with a plate having stop-pieces 121, which coact with the mutilated portions of the gear, the teeth upon the mutilated gear being so positioned as to primarily move the wrapper-transfer from a position shown in Fig. 1 and to a position shown in Fig. 14, and, secondarily, to the first position or at a position it assumes when the machine is at rest. Secured upon the forward end of the shaft 61 is a cam 122, Fig. 1, against which abuts one end of a lever 123, the opposite end being normally in the path of travel of a lug 124, (see Fig. 4,) carried by the stem of the plates 53ª, the object of the lever 123 being to reset the stem and plate 53ª in a retracted position and to release the wrapper after it has been engaged by the wrapper-transfer mechanism.

The operation of the machine as thus far described is as follows: Upon each revolution of the combined gear 17 and cam 18 the plunger 38 is reciprocated to cut a wrapper, which is deposited upon a wrapper-carrier, and the wrapper-carrier is moved a one-fourth revolution through the medium of the mutilated gear 65 and the gear 66, which contains the stops 68. At the same time the paster mechanism has operated to revolve the paste-rolls against the paste-feed drum and to move one of them over the edge of a wrapper in position and the wrapper-transfer is revolved to transfer the wrapper from the carrier to the rolling-table, it being understood, however, that these operations are timed, as heretofore described, and that the wrapper which is cut upon one revolution of the machine is pasted upon the second revolution, is transferred upon the third revolution, and deposited upon the rolling-table.

Pivotally secured to a projection 125, extending beneath the table, is a lever 126, Fig. 11, the lower end 127 of which rests between the plate 53ª and one of the projections 124 in the normal workings of the machine, the wrapper-carrier being free to revolve without coaction therewith, the upper end of the lever extending to a point contiguous to the under side of the table in alinement with one end of a lever 128, the opposite end projecting to a point in front of the machine in easy reach of the operator, whereby should the machine be operated without a wrapper being deposited on the wrapper-carrier the lever 126 may be moved, the lower end being forced inwardly and contacting with the projection 124, thus moving the plate 53ª out of the path of travel of the paster-rolls, thus preventing a depositing of paste upon the plate, which would otherwise have a tendency to gum the same and require cleaning before further operation of the machine.

I will now proceed to describe the mechanism for feeding, separating, weighing, and transferring the filler to the rolling-table.

Secured to the side of the machine opposite the cam-shaft are brackets 129, Fig. 2, which carry upon their outer ends a plate 130, and connecting the said plate and a longitudinal brace upon the machine are tables 131 and 132. Secured to the table 132 is a stand 133, and secured to the stand at one end and to the rear frame at the opposite end is a frame 134, which carries three stands 135, which form bearings for a shaft 136, the inner end of said shaft having a beveled gear 137, Fig. 19, secured thereon, which meshes with a beveled gear 138, journaled upon a stud-shaft 139, secured in a bearing 140, contained in the inner end of the frame 134, there being a gear-wheel 141 journaled upon the stud-shaft 139 and moving with the beveled gear 138, said gear 141 meshing with the gear 142, secured upon the hub of the clutch-gear 12, the gears and beveled gears being so proportioned that a complete revolution of the clutch-gear imparts a complete revolution to the shaft 136. In order to secure a proper feed of filler to the rolling-table to manufacture the cigarettes in a minimum time, I have found it necessary to employ a plurality of scales, separators, and filler-feeding mechanisms, the mechanisms for operating these parts being independent of each other, but controlled electrically to hold the machine in check until the filler mechanisms have all operated to provide independently their respective amounts of filler. Consequently while I have shown the several mechanisms, three being shown, a description of one will suffice for all. Each of the stands 135 is provided with an elongated bearing 143, upon which is secured a tube 144, which in reality forms the bearing, and secured upon the tube is a gear 145. Journaled upon the tube is a pinion 146, which carries a gear 147, the gear 147 containing one more tooth than the gear 145, whereby as the pinion 148 makes one complete revolution around the gears, the gear 145 being stationary, the gear 147 is revolved a distance equal to the pitch of the gear 145. To actuate the pinion 148, a disk 149 is journaled upon the tube 144, which carries a stud 150, upon which the pinion 148 is journaled, and secured upon the shaft 136 so as to revolve therewith is a plate 151, which carries magnets 152, the disk 149 acting as the armature therefor. Consequently as the magnets 152 are energized the plate is moved therewith, and through the medium of the mechanism just described the pinion 146 is revolved. Secured to the table 131 are stands 153, Fig. 22, in which is secured two shafts 154 and 155, upon which are journaled the upper and lower rollers 156 and 157, respectively, the upper rollers being fluted, as shown, and carried by the rollers 156 at points opposite the pinions 146 are gear-wheels 158, each of which mesh with an idler 159, carried by an arm 160, Fig. 2, secured to the stands 135. Consequently as the pinion 146 is revolved motion is imparted to the roller 156 and to the roller 157 through the medium of the gear 161, carried by the roller and meshing with the gear 158. Extending from a point immediately in front of the rollers to a point in front of the machine are guide-frames 162, which carry the feed-belts 163, which pass over rollers 164 at their outer ends and over the rollers 157 at the opposite end. Consequently as the roller 157 is revolved the belt 163 is moved, and the filler which is contained upon the belt is forced between the rollers to the separator, which I will now describe.

Secured to the table 131 are bearings 165, in which are journaled a shaft 166, which has secured thereon a pulley 167, over which runs a belt which goes to the counter-shaft, (not shown,) said shaft 166 being designed to revolve continuously, and secured upon the shaft at a point opposite each feed-belt are separators 168, which comprise a drum containing pins or pickers on the periphery thereof, the pins coacting with the filler as it passes through the rolls separating the tobacco into fine shreds or particles, the separator being enveloped by a cover 169, open at its lower end 170, through which the filler feeds to the scale-pockets 171, which are located directly beneath the same.

Secured to the table 132 is a stand 172, which acts as a fulcrum for the scale-beam 173, the scale-pocket 171 being suspended from the scale-beam at the forward end, as shown, and comprises a body opened at the bottom and normally closed by doors 174. There are magnets 175 and 176 arranged in the rear and in front of the fulcrum of the scale-beam, the beam acting as the armatures therefor.

Projecting from the front and rear side of the table 132 are rods 177 and 178, respectively, the rods being in pairs, and connecting the rods 178 are cross-pieces 179, which carry mercury-cups 180, and suspended from the rear end of the scale-beam is a contact-piece 181, by which a circuit is made between the two mercury-cups when the scale-pocket is empty and the rear end of the scale is depressed, and secured between the forward rods 177 are cross-piece 182, 183, and 184, the cross-pieces 182 carrying the magnets 176 and the cross-pieces 183 and 184, respectively, carrying mercury-cups 185 and 186, similar to the cups 180, there being a double contact-piece 187 suspended from the scale-beam over the mercury-cups 185 and 186, whereby a circuit is made between these cups when a sufficient amount of filler is contained in the scale-pocket and the front end of the scale-beam is lowered. Arranged upon the scale-beam is a screw 188, upon which is a weight 189, by which means the weighing capacity of the scale may be regulated. Secured to the forward bracket 129 is a stand 190, Fig. 25, in which is journaled a shaft 191, and upon said shaft is journaled loosely a combined gear and lever 192, the gear meshing with a segmental gear 193, carried by a lever 194, pivoted at 195 to a stand 196ª, carried by the table 131, the rear end of said lever 194 being connected by a link 196 to the cam mechanism, which will be hereinafter described. However, upon one revolution of the mechanism the lever 194 is moved to revolve the part 192 substantially a one-third revolution. Secured to the shaft 191 is a bifurcated arm 197, in which is pivoted a plate 198, which normally rests upon the upper face of the segment 193. Each time this segment moves in one direction it actuates a pawl, in the manner hereinafter to be described, to rotate the shaft 191 one-third of a revolution, and on the oscillation of the segment in the opposite direction the pawl is returned to its former position. Therefore as the bifurcated arm 197 is secured to the shaft 191 it makes one revolution, together with the plate 198, to every three backward and forward oscillations of the segment, so once in every three oscillations of the segment the plate 198 will be directly over the segment in position to be operated and forced upward by means of a cam-face 199, which will strike the lower surface of the plate 198 as the segment oscillates to bring the pawl back, and thus operates the plate 198 while the shaft 191 is stationary, which in turn forces up the end of the lever 200, secured to a shaft 201, the free end having a pin 202, which rests on the plate 198. Consequently as the lever 198 is moved the shaft 201 is rocked. Secured to the shaft 201 are arms 203, the rear ends of which are provided with pins 204, which as they are depressed due to the rocking of the shaft 201 engage with fingers 205, carried by the doors 174 of the scale-pockets, depressing the fingers and opening the doors. This operation being timed to take place when the scale-pockets are full or have a sufficient amount of filler therein for the cigarette, all of the scale-pockets being opened simultaneously, the doors may be held closed by any suitable spring means, and as this was fully shown in my former patent I do not deem it necessary to show it in detail in this application.

Secured upon the shaft 191 is a drum 206, and arranged beneath the table 131 are two drums 207, and around the drums pass a steel tape or ribbon 208, which carries at intervals around its length pockets 209, Fig. 47, closed by a door 210, Fig. 22, provided with an arm 210ª, the pockets being designed to position beneath the scale-pockets and to receive the filler as it empties therefrom. The drum 206 is the actuating-drum for the ribbon and is designed to be moved a one-third revolution upon a complete revolution of the driving mechanism upon the main shaft. Consequently I have provided a ratchet-ring 209ª, Figs. 25 and 26, carried by the drum 206, with which coacts a pawl 210ᵇ, carried by the arm of the combined gear and lever 192. Consequently as the link 196 is reciprocated the drum is moved and the pockets are moved a distance equal to one third the periphery of the drum 206, which is the distance the pockets 209 are spaced apart upon the tape 208. Consequently the pockets are successively brought into vertical alinement over the filler-transfer 211 to be carried to the rolling mechanism. It will thus be seen that while the machine has made three revolutions the three scales are filled and the feed of the filler is stopped, that the scale-pockets are opened simultaneously, and that three of the pockets upon the tape are filled to be successively fed to the rolling mechanism, by which means I allow sufficient time for the weighing mechanism to balance, as the scales can operate and fill during three operations of the rolling mechanism, which is a point I consider of great value, although I wish it to be understood that as many scales and mechanisms for actuating the same may be employed as are desired without departing from the spirit of my invention to secure any desired degree of output for the machine.

Secured in suitable bearings carried by the longitudinal side brace of the machine is a shaft 212, Figs. 27 and 28, and secured loosely upon said shaft is an arm 213, which carries at its outer end the filler-transfer 211, which comprises a body having a door 214, normally held in a closed position, and a forward-projecting plate 215, and carried by the hub of said arm 213 is an arm 216, Fig. 29, which is connected by a rod 217 to the lower end of a rock-lever 218, said lever being substantially pivoted midway its length in the stand 116 already described, the opposite end of a lever 218 being pivotally secured to the inner end of a cam-lever 220, and to the extreme upper end of said lever 218 is the end of the link 196, which operates the lever 194 already described. Upon the cam-shaft 62 contiguous to the rock-lever 218 is a cam 221, which is preferably a double cam, one for forward and one for backward movement, and coacting therewith are cam-rollers 222, which rock the lever 218, the form of the cam being such that the lever 213 is first moved to a position shown at A in dotted lines in Fig. 30 and then at B in dotted lines in Fig. 30, in which position it remains for a half-turn of the cam-shaft or until the pocket 211 is filled, the return of the pocket 211 to the position shown in full lines in Fig. 30 being first in the position shown at A and then to the downward position, where it remains only momentarily or until the pocket is emptied on the rolling-belt.

Secured to the front and intermediate frames are plates 223, in which is journaled a shaft 224, and carried by the plates 223 are supplemental plates 225, to which are secured an upright 226, to which the stem 227 of the table 228 is secured, the table having plates 229, as shown in Fig. 27, secured upon each side thereof, and arranged between the plates and projecting therethrough at each end is a rod 230, around which passes one end of the rolling-belt, it being clamped thereto by means of a clamp 231, forced against the belt by means of a screw-rod 232, screwing through a rod 233 similar to the rod 230, the rolling-belt passing over the table and between arms 234, which acts as a slack take-up for the belt. Arms 234 project from a hub 235, secured upon the shaft 212 and move with the shaft, there being two rollers 236 and 236 arranged between the arms at their outer ends and journaled in the arms at each end, the rollers being provided with pinions 237 at one end, with which mesh oppositely-arranged worms 238 and 239 upon a rod 240, by which the rod may be revolved, and the worms, and consequently the rollers 236, may be revolved, the rolling-belt passing over the upper roller and between the two rollers, as shown, whereby when the rollers are revolved the belt may be either lengthened or shortened.

To provide or take up the slack of the belt while the machine is in operation, I provide automatic mechanism, which consists in an arm 242, secured to the shaft 212, (see Fig. 31,) which is connected by a rod 243 to the lower end of a rock-arm 244, also pivoted substantially midway its length in a stand 116, heretofore described, the upper end of said rock-arm being pivotally secured to the inner end of the cam-lever 245, carrying cam-rollers 246, which coact with a cam 247, secured upon the cam-shaft. Consequently after the filler has been deposited upon the rolling-belt and the pocket 211 is raised therefrom the raised portion $247^a$ forces the slack take-up arm 234 into the position shown by dotted lines in Fig. 31, which allows a sufficient amount of slack in the rolling-belt to form the bight for the filler as the rolling mechanism starts to act.

Secured to the shaft 224 are the roller-arms 245, which are connected by the roller 246, which slides beneath the rolling-belt and in its movement rolls the cigarette into its form, and to actuate the roller-arms I have provided an arm $247^b$, Fig. 32, also secured to the shaft 224, which is connected at its upper end by a link 248 to the lower end of a rock-arm 249, also pivoted to a stand 116, the upper end of said arm being pivotally connected to a cam-lever 250, carrying cam-rollers 251, which coact with a cam 252, secured upon the shaft 62. Consequently as the shaft 62 makes a complete revolution the roller-arms are moved from the position shown in Fig. 27 to the position shown in Fig. 10 and back again, the formation of the cam being such that the arms are held in these positions for a short period of time or until the filler is dumped upon the belt or until the cigarette is transferred to the cutting mechanism.

Journaled in bearings 253, secured to the lower longitudinal cross-piece of the machine, is a shaft 254, upon which is secured an arm 255, Fig. 29, which is connected by a rod 256 to the end of a lever 257, carried by the arm 213. Consequently the movement of the arm 213 is transferred to the arm 255 and the shaft 254 is rocked accordingly. Also secured to the shaft 254 is an arm 258, Fig. 36, in which is secured at its outer end a rod 259, which carries at its outer end a cross-piece or scraper 260, which is designed to pass beneath the belt and to scrape against the same to release the cigarette therefrom should it adhere thereto. Secured in ears projecting from the scraper 260 is a rod 261, upon the outer ends of which are pivotally secured ears 262, Fig. 44, carried by a plate 263, said plate and the body of the scraper forming a pocket to receive and carry the cigarette to the cutting mechanism.

Secured to the longitudinal cross-piece upon one side of the mechine is a plate 264, Fig. 36, which carries an integral projecting plate 265, in which are secured two shafts 266, upon which the upper and lower trimming-knife frames 267 and 268, respectively, are journaled, the hubs of the two knife-frames being provided with gear-segments 267$^a$, whereby the knife-frames move in unison, and secured upon the cam-shaft 62 is a cam 269, which coacts with the cam-lever 270, the lower end of which is connected with a cross-bar 271, carried by the upper-knife frame 267. Consequently as the cam-shaft makes a complete revolution the knives are brought together, as shown in Fig. 40, in a shearing relation and are separated again into the initial position. (Shown in Fig. 36.)

Secured to the plate 265 are two pins 271$^a$, upon which are secured a connecting-plate 272, to which is secured an angle-piece 275, which carries the cutting-table 274, the cutting-table being provided with two inwardly-projecting wings 275, with which the rear end 276 of the plate 263 contacts to force the forward end thereof downward beneath the cutting-table. Projecting from the plate 265 is a stud 277, upon which is pivotally secured a plate 278, which normally rests in the position shown in Fig. 36, the lower end of said plate and the cutting-table forming a pocket for the cigarette while it is being cut, the upper-knife frame 267 carrying a projection 279, which contacts with a cam projection 280 on a stud 277 to move the frame 278 downward and to sweep the cigarette from the cutting-table into the pocket 282, which is in the position shown in dotted lines in Fig. 36 in this stage of the operation. In order to center the cigarette with reference to the cutting-knives, I have provided two links 283, carried by the rods 271, to which is pivotally secured at 284 two centering-arms 285, having wings 286 at their upper ends which are in alinement with the cigarette and normally contact with the ends thereof by means of a light spring 286$^a$, connecting the arms 285, one of the arms having a projection 287, with which a rod 288, carried by the lower cutting-frame 268, contacts to separate the centering-arms and to release the cigarette when the knives are separated, the two arms 285 being joined together at 289, so they move in unison.

In order to adjust the knives 290 in the lower frame 268, the knives are secured by a bolt 291, passing through a slot 292 in the frame, a screw 293, screwing in the frame and bearing against the bolt, serving as the means to secure a minute adjustment. The upper knives 294 are similarly adjusted, but are loosely secured to the frame by springs 295 and 296, Fig. 40, as shown, whereby I secure a perfect shearing relation between the upper and lower knives, which could not be satisfactorily secured were all the knives rigidly secured to the knife-frame.

In order that the cigarette after being completed may be passed in view of the operator, I have provided an elevating arrangement to carry the cigarette to the top of the machine, which comprises a sprocket-chain 297, Fig. 1, driven by a sprocket-wheel 298, secured upon the cam-shaft 62 and passing over idlers 299, arranged at the top and bottom of the machine, and upon the sprocket-chain I have arranged a plurality of elevating-pockets 300, which successively pass between the pockets 282 and take the cigarette therefrom when the pockets 282 are in the position shown in Figs. 1 and 36. To move the pockets 282 a quarter-revolution or from a position in front of the cutting-table to a position in alinement with the elevating-pockets, or vice versa, I provide a bracket 301, secured to the plate 265, which has a bearing 302, in which is journaled a shaft 303, having secured on its lower end a mutilated bevel-gear 304, and meshing with the teeth thereon is a mutilated segmental gear 305, which is journaled on a stud-shaft 306, secured in a bearing 307, also carried by the bracket 301. Secured upon the hub of the mutilated segmental gear 305 is an arm 308, in which and the body of the mutilated segmental gear is a pin 309, through which passes one end of a rod 310, the opposite end of said rod being pivotally secured to the rod 258 already described. Consequently through the medium of the rods 256 and 210 the movement already described as being imparted to the arm 213 is imparted to the arm 258 and to the mutilated segmental gear 305, and as the cigarette is being deposited upon the cutting-table the preceding cigarette is being moved to a point in alinement with the elevating mechanism, and as the arm 258 moves toward the rolling-table the pockets 282 are being moved into the position shown in dotted lines in Fig. 36, the knives are being separated, and the cut cigarette is forced into the pocket 282 and the operation is repeated.

Referring to Figs. 33, 34, and 35, I have shown a modification of the rolling mechanism, which comprises a transverse clamping-bar 311, which is designed to be forced down when the rolling-arm 245 gets into the position shown in Fig. 33, in which position it remains momentarily due to the formation of the cam 252 or until the slack take-up has moved back to take up the initial pocket and to primarily envelop the filler in the wrapper and form the cigarette, the object of the bar 311 being to clamp the edge of the wrapper and to hold the same firmly while this operation is going on. To accomplish this object, I provide a magnet 312, the armature 313 of which being pivoted at 314, the projecting ends 315 of the armature resting above the angled ends 316 of the rods 317, secured to their upper ends to each end of the bar 311, whereby when the roller-arm 245 gets into a position shown in Fig. 33 a contact is made between contact-points E and F and the magnet becomes energized, attracts the armature, and the arms 315 will be forced down against the angled ends 316 of the rods, forcing the rods and the bar 311 downwardly to clamp the wrapper, a further movement of the rolling mechanism breaking the contact between E and F and releasing the clamping-bar.

I will now proceed to describe the regulating mechanism, which comprises several circuits dependent upon each other, reference being had to Figs. 45, 6, 7, 8, 19, 21, 22, 23, and 24, in which 317ª are electric magnets carried by the plunger 38, the wires passing therefrom to a push-button 318 and to the commutator 319, secured upon the intermediate shaft 61, which is normally in contact when the machine is at rest, and upon each complete revolution of the same the armature 320 of the magnets 317ª operating when the magnets are energized to move a catch 321 and to release the safety-frame 322, the upper side 323 of the safety-frame acting as a bridge between the two contact-points 324 when the catch has been released and the safety-frame dropped. The catch 321 being secured to the cross-piece of the punch-frame of course descends when the punch descends, and the catch 321 will automatically engage the safety-frame, and the safety-frame will thus be raised with the punch and restore it to its normal position. The magnets 31 are in a circuit with the two contact-points 324, the circuit being completed to energize the magnets 31 and to release the clutch and start the machine when the safety-frame is down and when the scale-pockets have been filled sufficiently to overbalance the scale-beam to a degree to make a circuit between the mercury-cups 185. Consequently to start the machine it is first necessary that the safety-frame is down to make a contact between the contact-points 324, which operation is controlled by the operator actuating the push-button, and, secondly, there must be sufficient filler in the scale-pockets to overbalance the scale-beam to complete the circuit and to release the clutch to start the mechanism, it only being necessary, however, to complete this circuit momentarily, as when the clutch is released the machine starts and makes a complete revolution, the clutch only acting to stop the machine at one point in its revolution. Consequently I have provided a commutator 325, (shown diagrammatically in Fig. 45 and also shown in elevation in Fig. 1,) said commutator consisting of a cylinder having five different sets of contacts 327, 335, 331, 333, and 328, which are adapted to be contacted, respectively, by brushes 326, 334, 330, 332, and 329. The contact-strips upon the commutator are arranged around the circumference in such a manner as to accomplish the different results desired. In timing the movements of the several parts said commutator is located upon the vertical shaft 191 and is therefore revolved through the agency of the segment 193 and therefore makes one-third of a revolution to each revolution of the drive-shaft. I lead one of said wires of the circuit in which magnets 31 and mercury-cups 185 are located to a brush 326, which as the machine starts contacts with a contacting material, (shown in shaded lines,) which is in circuit with the contacting material 328, which is always in contact with the brush 329.

When the scale-pockets have received their predetermined charge of filler to positively hold the forward end of the scale-beams down until the scale-pockets have been emptied, I have provided the magnets 176, which are in circuit with the mercury-cups 184, the brush 330, and the contact-piece 331, which completes the circuit when the scale-pockets are down, and when a contact is made with the contact-strip or when the machine starts upon its first revolution, when the contact is broken by the commutator, the magnets 176 will be deënergized, allowing the scale-beams to tip in the opposite direction while the pockets are being refilled and during the second and third revolution of the machine.

After the scale-pockets have been emptied, which occurs shortly after the machine has started its first revolution and the rear ends of the scale-beams are depressed, the magnets 175 become magnetized as the brush 332 in circuit therewith comes in contact with the contacting material 333 and completes the circuit, thus holding the rear ends of the scale-beams down until the circuit is broken by the further movement of the commutator 325. When the rear end of the scale-beams are down, a circu. is established through the mercury-cups 180 and the magnets 152 of the filler-feed mechanism, which starts the filler-feeding mechanism, which continues to feed the material into the scale-pockets until the scale-pockets receive their predetermined charge of filler, and the circuit is broken between the mercury-cups 180 by the movement downward of the forward end of the scale-beam. It being understood that I provide a brush 334 to contact with contact-pieces 335 upon the second and third movement of the commutator, which provides a direct circuit for the magnets 31 to coact with the safety device independent of the scales, while the mechanism is making the last two revolutions of the three revolutions the mechanism revolves while the scales are operating.

In the operation of the machine when the clutch-gear is stopped the plunger is in a raised position and the plate 323 is held by the catch 321, when upon the operator pressing the push-button 318 magnets 317 are energized, attracting the armature 320, operating the catch 321 to release the plate 323 and allow the safety-guard to drop, which, if it meets with no obstruction, the plate 323 will contact with the contact-points 324 and complete the secondary circuit, which energizes the clutch-magnets 31, thereby releasing the clutch and allowing the machine to start, it being understood that when the machine is stationary to start the same a sufficient charge of the filler must be contained in the scale-pockets to overbalance the scale-beams to complete the secondary circuit through the mercury-cups 185, there always being a contact in this point of the operation between the brush 326 and the contact-piece 327. Consequently as the magnet 31 is energized the arm 27 is released from the pin 26 and the clutch mechanism commences to revolve. As it makes one revolution the punch is given one reciprocation, cutting a wrapper. The wrapper-carrier is given a one-fourth turn, the pasting-roll receives a one-half revolution, the transfer mechanism receives a one-half revolution, thus cutting a wrapper, pasting a wrapper, and transferring a wrapper to the rolling-table upon one revolution of the clutch-gear. It is of course understood that the operator keeps her foot upon the press-button all the time the machine is operating and if she desires to stop the machine at any time raises her foot. Coincident with this operation as the clutch-gear is revolved a complete revolution the filler-carrier is moved, a charge of the filler is transferred from the filler-carrier to the rolling-belt and is rolled and inclosed by the wrapper, a cigarette is led between the cutting-knives, the knives are moved together, and the cigarette is moved in a position to be elevated to the top of the machine in view of the operator. After the machine has been started the magnets 317ª are energized through the medium of the commutator 319 upon the intermediate shaft 61, and upon every second and third revolution of the clutch-gear a circuit containing the magnet 31 is completed through the brush 334 and the contact-pieces 335. Consequently the operation of the machine is controlled upon every first revolution of the clutch-gear, and the three scales have a time to fill and balance equal to the time taken to make three revolutions of the clutch-gear, the feed of the filler to the scales being cut off when the scales overbalance and when the mercury-cups 180 open the circuit containing the magnets 152 and said magnets are demagnetized.

Having thus fully described my invention, what I claim as new and useful, is—

1. In a machine for making cigarettes, wrapper-cutting mechanism, rolling mechanism, means for conveying the wrapper to the rolling mechanism, a plurality of scale-beams, filler-receptacles secured to one end of the scale-beams, means for feeding the filler to said scale-receptacles, means for automatically emptying the scale-receptacles simultaneously when all the scale-receptacles are down, means for conveying the filler to the rolling-table, a clutch for controlling the wrapper-cutter, transfer apparatus and rolling mechanism, means for operating said clutch as many times after the scale-receptacles are empty as there are scale-beams less one, and means for arresting the release of the clutch until all of the scale-beams are down, when the clutch will be released automatically, as and for the purpose specified.

2. In a machine for making cigarettes, wrapper-cutting mechanism, rolling mechanism, means for delivering the wrapper to the rolling mechanism, a plurality of scale-beams, filler-receptacles secured upon one end of the scale-beams, means for feeding the filler to each scale-receptacle, means for automatically cutting off the feed from each scale-receptacle as each receptacle is filled with the proper weight of material and descends, means for automatically emptying all the scale-receptacles simultaneously when all of said scale-receptacles have descended, means carrying the filler to the rolling mechanism, an electromagnetic-controlled clutch controlling the wrapper cutting, transferring and rolling mechanism, whereby said parts are operated one step each time the magnets of said clutch are energized, a switch, electric means for energizing the magnets of the clutch by means of the switch as many times after the scale-receptacles are emptied as the total number of scale-receptacles less one, and means for then changing the course of the current so that the clutch-magnets cannot be energized until all of the scale-receptacles are down, thus completing the circuit and energizing the magnets.

3. In a machine for making cigarettes, a clutch, electromagnets controlling said clutch, a wrapper-cutting mechanism, rolling mechanism, means for transferring the wrapper to the rolling mechanism, all of said elements adapted to operate synchronically one step at a time each time the clutch is operated, a plurality of scale-beams, scale-receptacles secured at one end of each beam, an independent feeding mechanism for each scale-receptacle, electromagnetic means for starting the feed when the scale-receptacle is up and stopping the feed when the scale-receptacle is down, means for automatically emptying the scale-receptacles when all of said receptacles are down, a rotating commutator adapted to operate synchronically with the operating mechanism, two contact-points located in juxtaposition to each scale-beam, each set of contact-points being connected to the next set in series, the two contact-points of each set adapted to be connected one with the other when the scale-receptacles are lowered, a switch adapted to be operated by the operator, electrical connections extending from the switch, a commutator and contacts, the conducting-strips upon the commutator so arranged that the circuit will be established through the switch, commutator and clutch-magnets each time the switch is closed for as many times after the scale-receptacles have been emptied as the total number of said scale-receptacles less one, the circuit then being changed by the commutator so that it must pass through the switch, commutator and all of the contacts of the scale apparatus before the magnets of the clutch can again be energized, as specified.

4. In a machine for making cigarettes, a wrapper-cutting, a wrapper-delivering, a wrapper-pasting, a cigarette-rolling, a cigarette trimming and delivering mechanisms, a series of scale-beams, scale-receptacles secured upon one end of said scale-beams, a feeding mechanism for feeding the filler to the scale-receptacles, means whereby all of the scale-receptacles are emptied when all of the scale-receptacles are down, means for operating the machine synchronically whereby one wrapper is cut, transferred, pasted and one cigarette is rolled, trimmed and delivered each time the machine is operated, means for operating the machine irrespective of the position of the scale-beams as many times after the scale-receptacles have been emptied as there are scale-beams less one, and means for preventing the next movement of the machine until all of the scale-beams are down, as and for the purpose specified.

5. In a machine of the character described, a series of scale-beams, scale-receptacles secured to one end of said scale-beams, an independent feeding mechanism for each scale-beam adapted to feed into the scale-receptacles, means for operating the feeding mechanism consisting of a constantly-rotating member common to all the feeding devices, second members, one for each feeding device and journaled concentric with the rotary member but separate therefrom, driving mechanism connecting each second member with its feeding device, electromagnets arranged upon one of the members, the other member of each feeding device acting as an armature, two contact-points arranged in juxtaposition to each scale-beam, the contact-points of each set adapted to be electrically connected when the scale-receptacle is up and the electrical connection broken when the scale-receptacle is down, a source of electricity, an electric circuit from one terminal of the source of electricity to one of the contacts of each scale-beam, and from the other contact of each scale-beam, to and through the electromagnets of the feeding device of the same scale-beam, back to the other terminal of the source of electricity.

6. In a machine of the character described, a series of scale-beams, scale-receptacles secured to said scale-beams, an independent feeding device for feeding the filler to each scale-receptacle, means for operating said feeding device, consisting of a constantly-rotating shaft, a series of disks, one for each feeding device secured upon said shaft and adapted to rotate therewith, electromagnets carried by said disk, disk-shaped armatures journaled concentric with the rotating shafts but independent thereof, said armatures arranged in juxtaposition to the cores or the magnets, a source of electricity, electric switches adapted to be closed when the scale-receptacles are up, an independent electric circuit for each filling device including in the same the source of electricity of said device, and the electroswitch of its particular scale-beam so that when the electromagnets are energized the armature will be caused to rotate therewith, and means for transmitting the movement of the armatures to the feeding devices independent of one another, as specified.

7. In a machine of the character described, a manufacturing portion, a feeding and weighing portion, a series of scale-beams included in the weighing portion, scale-receptacles secured to the scale-beams adapted to receive filler from the feeding device, a stationary electromagnet arranged in juxtaposition to the scale-beam, an armature carried by the scale-beam, the tendency of the magnet when energized being to hold the scale-receptacle lowered, a commutator adapted to rotate with intermediate movements synchronically with the manufacturing mechanism, there being as many movements in a complete revolution of the commutator as there are scale-beams, said commutator adapted to make one complete revolution between the successive emptying of the scale-receptacles, means for preventing the last movement of the commutator until all the scale-receptacles are lowered, an electric circuit through the magnets adjacent the scale-beam and through the commutator upon this last movement to hold the scale-receptacles down against vibration while said receptacles are emptied, as specified.

8. In a machine of the character described, scale-beams, scale-receptacles carried by said scale-beams, a stationary electromagnet arranged in juxtaposition to the scale-beams, armatures carried by the scale-beams, the tendency of said magnet when energized being to tilt the scale-beam so as to hold the scale-receptacle raised, a commutator adapted to revolve synchronically with the operation of the machine, an electric circuit containing the magnets and certain conducting-strips upon the commutator, said strips so arranged upon the commutator that said magnets will be energized for a short period directly after the scale-receptacles have been emptied, as specified.

9. In a machine of the character described, a series of independent operating scale-beams, scale-receptacles carried by said scale-beams, independent feeding mechanisms for each scale-beam, said feeding mechanism consisting of an endless belt, the filler adapted to lie upon the upper run of said belt, two rollers, one arranged upon the other, the belt at its rearward end adapted to pass around the lowermost roller so that the filler will pass between the upper roller and the belt, a separating-roller arranged at the rear of the two feeding-rollers, picker-teeth protruding from said separating-roller adapted to shred and separate the tobacco as it passes from the belt into the scale-receptacles, means for revolving the feeding-rollers, and means for arresting the movement of said rollers when the scale-receptacle is down, and starting said rollers when the scale-receptacle is up, as and for the purpose specified.

10. In a machine of the character described, a series of independently-operating scale-beams, a scale-receptacle carried by each scale-beam, an independent feeding mechanism for each scale-receptacle, each consisting of two rollers, one arranged above the other a slight distance apart, an endless belt, upon the upper run of which the tobacco is adapted to lie, the rearward end of said belt passing around the lowermost roller, corrugations formed in the periphery of the upper roller, a constantly-revolving separating-roller arranged at the rear of the two feeding-rollers, picker teeth or pins protruding from the periphery of said roller for shredding or separating the tobacco as it issues from the feed-rollers, a chute for conveying the tobacco to the scale-receptacles, driving mechanism for operating the feed-rolls, electrical contacts arranged in juxtaposition to each scale-beam, and electric means for starting the driving mechanism when the contacts are closed and stopping said driving mechanism when the contact is broken, as specified.

11. In a machine of the character described, rolling mechanism, a series of scale-beams, scale-receptacles carried by said scale-beams, feeding mechanism, means for automatically emptying the scale-receptacles when all of them are down, means for carrying the filler to the rolling mechanism consisting of an endless belt, pockets secured to said belt, said belt adapted to be driven synchronically with the movement of the rolling mechanism, said belt arranged so that the pocket is always underneath the scale-receptacles when the same are emptied, as specified.

12. In a machine of the character described, in combination, a wrapper-carrier apparatus, consisting of radial arms, flat plates secured to the outer ends of said arms against which the wrapper is held, a pasting mechanism consisting of a rotating member adapted to rotate synchronically with the wrapper-transfer, a lever pivoted to said rotary member upon each side of its pivot, pasting-rolls journaled in one end of the levers, springs secured to the other ends of the levers tending to throw the rollers outward, means for revolving the rollers upon their own axis as the rotary member revolves, said rollers adapted to come in contact with a portion of one end of the wrapper, a paste-roll, a paste-receptacle arranged above the roll, means for revolving the paste-roll in contact with the paste in the receptacle synchronically with the movement of the wrapper-transfer apparatus, the pasting-rolls adapted to come in contact with the paste-rolls as they revolve, as specified.

13. In a machine of the character described, the combination, a wrapper-cutting mechanism and pasting mechanism with a carrier mechanism, consisting of a hub mounted upon a shaft, radial arms extending outward from said shaft, said hub adapted to rotate synchronically with the wrapper cutting and pasting mechanism, rods mounted to slide radially along the radial arms, flat plates secured to the outer ends of said rods, springs tending to force said rods outward, fingers adapted to automatically engage and hold the wrapper to the plates as said wrapper is presented to be pasted, means to be operated at the option of the operator for retracting or pushing inward the radial rod and plate which is presented to the pasting mechanism, as specified.

In testimony whereof I have hereunto affixed my signature in the presence of two subscribing witnesses.

ALFRED H. RANDALL, Jr.

Witnesses:
  MARY E. HAMER,
  L. W. MORRISON.